(12) United States Patent
Matsumoto et al.

(10) Patent No.: US 8,566,063 B2
(45) Date of Patent: Oct. 22, 2013

(54) ROTATION ANGLE DETECTOR

(75) Inventors: Koichiro Matsumoto, Kyoto (JP);
Yoshiyuki Kono, Obu (JP); Hitomi Honda, Kariya (JP); Akitoshi Mizutani, Okazaki (JP)

(73) Assignee: Denso Corporation, Kariya (JP)

( * ) Notice: Subject to any disclaimer, the term of this patent is extended or adjusted under 35 U.S.C. 154(b) by 358 days.

(21) Appl. No.: 13/151,645

(22) Filed: Jun. 2, 2011

(65) Prior Publication Data

US 2011/0301913 A1    Dec. 8, 2011

(30) Foreign Application Priority Data

Jun. 2, 2010   (JP) .................. 2010-126870
Oct. 6, 2010   (JP) .................. 2010-226457

(51) Int. Cl.
*G06F 15/00*    (2006.01)
*G01B 7/30*     (2006.01)

(52) U.S. Cl.
USPC ......................... 702/151; 324/207.25

(58) Field of Classification Search
USPC ........ 702/150, 151, 154; 73/114.26; 318/609; 324/207.2, 207.25
See application file for complete search history.

(56) References Cited

U.S. PATENT DOCUMENTS

| | | | |
|---|---|---|---|
| 6,753,681 B2 | 6/2004 | Enomoto et al. | |
| 7,321,216 B2 * | 1/2008 | Suzuki ................. | 318/609 |
| 2003/0080732 A1 | 5/2003 | Okazaki et al. | |
| 2004/0169503 A1 | 9/2004 | Enomoto et al. | |
| 2004/0189288 A1 | 9/2004 | Mizutani et al. | |

FOREIGN PATENT DOCUMENTS

| | | |
|---|---|---|
| JP | 2004-294145 A | 10/2004 |
| JP | 2007-256121 | 10/2007 |

OTHER PUBLICATIONS

Japanese Office Action dated May 11, 2012, issued in corresponding Japanese Application No. 2010-226457 with English translation.

* cited by examiner

*Primary Examiner* — John H Le
(74) *Attorney, Agent, or Firm* — Nixon & Vanderhye P.C.

(57) ABSTRACT

A rotation angle detector is provided with a frame-shaped yoke which includes a first wall and a second wall in parallel. A rotation axis of a detection subject extends inside of the frame-shaped yoke. A magnetic flux vector is uniformed in a direction orthogonal to the first wall, whereby even if a position of a Hall element deviates, the detected magnetic flux density is less varied. A robustness of the detector is enhanced. A distance between the Hall element and a second inner surface of the second wall is shorter than that between the Hall element and a first inner surface of the first wall. A length of the second inner surface is longer than a length of the first inner surface. At a vicinity of the second wall, the area in which the magnetic flux vector is uniformed can be enlarged. Thus, the robustness is further enhanced.

24 Claims, 19 Drawing Sheets

FIG. 1A
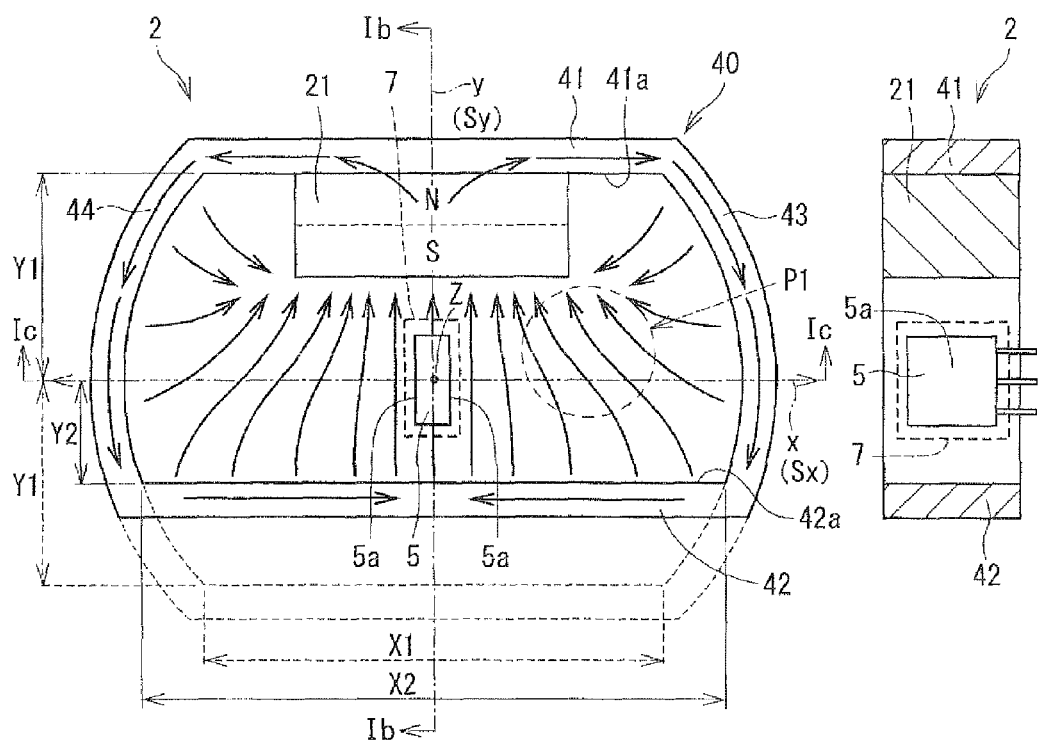
FIG. 1B
FIG. 1C
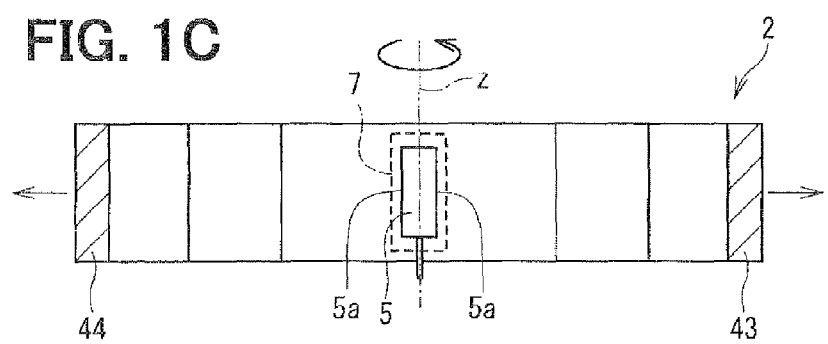

FIG. 11A
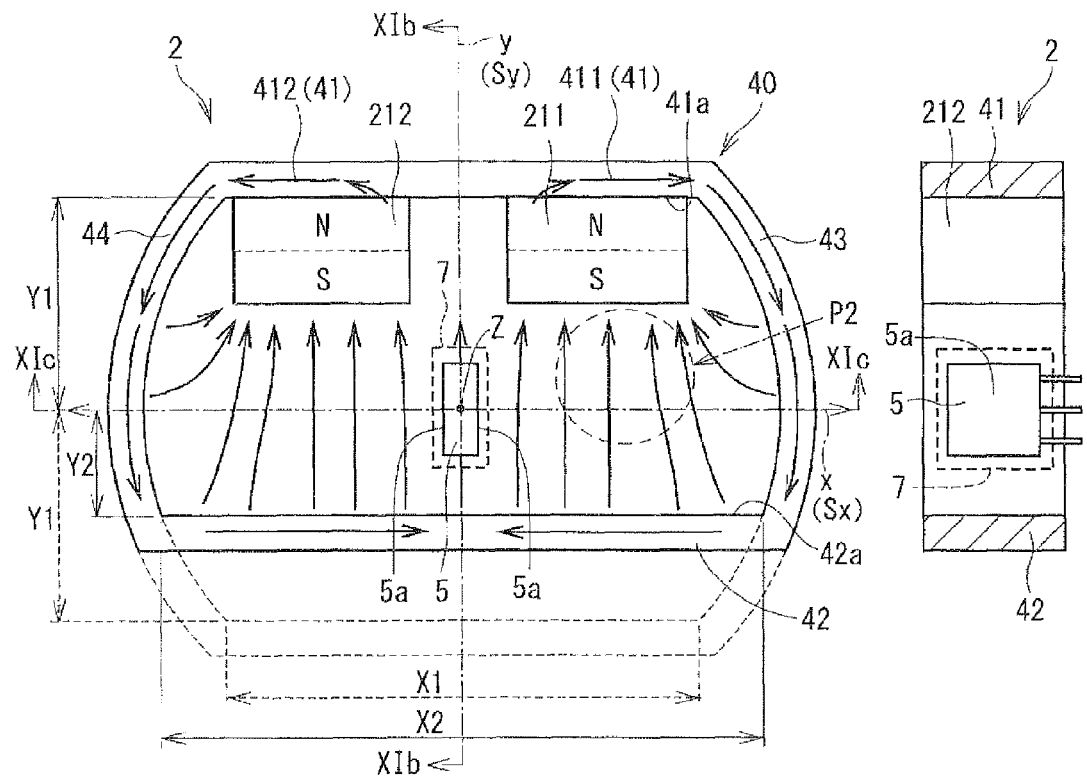
FIG. 11B
FIG. 11C
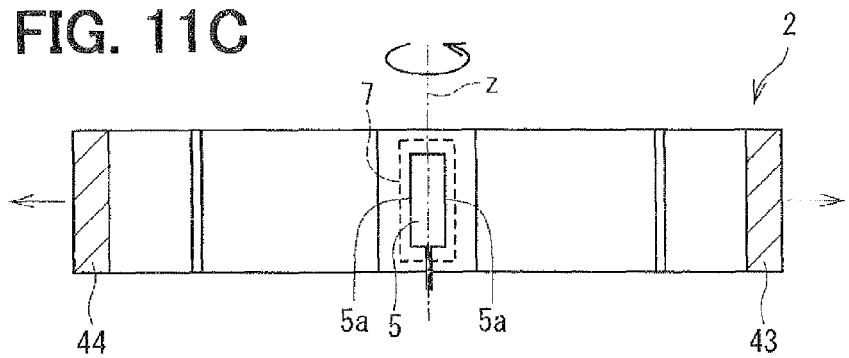

FIG. 24    COMPARATIVE EXAMPLE

ROTATION ANGLE DETECTOR

CROSS-REFERENCE TO RELATED APPLICATION

This application is based on Japanese Patent Applications No. 2010-126870 filed on Jun. 2, 2010, and No. 2010-226457 filed on Oct. 6, 2010, the disclosures of which are incorporated herein by reference.

FIELD OF THE INVENTION

The present invention relates to a rotation angle detector which detects rotation angle of a detection subject.

BACKGROUND OF THE INVENTION

Conventionally, a rotation angle detector has a magnet generating magnetic field and a magnetic detecting element rotating relative to the magnet for detecting a variation in magnetic field. Based on output signals of the magnetic detecting element, the detector detects the rotation angle of the detection subject.

JP-2007-256121A shows a rotation angle detector in which a magnet and a guide member are arranged in such a manner as to confront with each other so that the magnetic field is homogenized therebetween. A magnetic-field-measuring element is disposed between the magnet and the guide member. It should be noted that the guide member made of permeability material corresponds to a yoke and the magnetic-field-measuring element corresponds to a magnetic detecting element.

JP-2003-177004A (US-2003-0080732A1) shows an angle sensor in which Hall elements are arranged in such a manner as to confront a magnet through a rotational center in a cylindrical yoke, whereby linear variation in magnetic flux is enlarged.

Japanese Patent No, 4321665 (US-2004-0189288A) shows a rotation angle detector in which two magnets are arranged to confront with each other through a magnetic detecting element. Each of magnets has a curved outer surface and a curved inner surface, whereby magnetic flux passing through the magnetic detecting element is made stable.

In the detector shown in JP-2007-256121A, since there is no yoke around the magnetic-field-measuring element, the accuracy of detector is deteriorated by disturbance magnetic field. Meanwhile, in the sensor shown in JP-2003-177004A, the yoke is circumferentially provided around the Hall elements, so that the accuracy of the sensor is not always deteriorated by disturbance magnetic field. However, in this sensor, due to leakage magnetic flux, the magnetic flux vector is curved so that an area in which magnetic flux vector is uniform becomes smaller. Thus, a position of the magnetic detecting element deviates and a detection flux density changes, so that a detection error arises and "robustness" is deteriorated. That is, a system characteristic for maintaining a current condition relative to a disturbance or design error is inferior.

In the rotation angle detector shown in Japanese Patent No. 4321665, the magnetic flux vector is uniformed and "robustness" is improved. However, the shape of the magnet is complicated, which may cause an increase in manufacturing cost.

SUMMARY OF THE INVENTION

The present invention is made in view of the above matters, and it is an object of the present invention to provide a rotation angle detector which has high robustness and simple configuration.

The present invention relates to a rotation angle detector which detects rotation angle of a detection subject. In the present invention, an arbitrary plane which includes a rotation axis of the detection subject is referred to as a symmetrical plane, and a plane which includes the rotational axis of the detection subject and is orthogonal to the symmetrical plane is referred to as a reference plane. The rotation angle detector is provided with a magnetic-flux-transmitting means, a magnetic flux generating means and a magnetism-detection means.

The magnetic-flux-transmitting means is shaped like a frame which is symmetrical with respect to the symmetrical plane. The rotation axis of the detection subject extends inside of the frame-shaped magnetic-flux-transmitting means. The magnetic-flux-transmitting means is comprised of a first wall, a second wall, a third wall and a fourth wall which are made of magnetic material. The first wall and the second wall are arranged opposite with respect to the reference plane. The third wall connects the first wall and the second wall at one end thereof. The fourth wall connects the first wall and the second wall at the other end thereof.

The magnetic flux generating means is disposed on an inner surface of the magnetic-flux-transmitting means symmetrically with respect to the symmetrical plane. The magnetism-detection means is disposed between the first wall and the second wall in such a manner as to relatively rotate with respect to the magnetic-field-generating means and the magnetic-flux-transmitting means according to a rotation of the detection subject. The magnetism-detection means having a detection surface which detects a magnetic flux. The magnetic-field-generating means is disposed on only an inner surface of the first wall and is magnetized in a direction orthogonal to the first wall.

Since the magnetic-flux-transmitting means is shaped like a frame which the rotation axis of the detection subject extends through inside thereof, the magnetic transmitting has a high shield effect against magnetic disturbances. Further, permeance of the magnetic circuit is increased and demagnetization of the magnetic-field-generating means is restricted. The magnetic flux density which the magnetism-detection means detects is increased, so that the SN ratio is enhanced. The magnetic-flux-transmitting means includes a yoke.

Further, since the magnetic-flux-transmitting means and the magnetic-field-generating means are symmetrically formed with respect to the symmetrical plane, a balance of the magnetic flux is improved. The magnetic vector is more uniformed and the robustness is enhanced.

Still further, since the magnetic-field-generating means is disposed on only the inner surface of the first wall, it configuration is made simple.

BRIEF DESCRIPTION OF THE DRAWINGS

Other objects, features and advantages of the present invention will become more apparent from the following description made with reference to the accompanying drawings, in which like parts are designated by like reference numbers and in which:

FIG. 1A is a schematic view of a rotation angle detector according to a first embodiment;

FIG. 1B is a cross sectional view taken along a line Ib-Ib of FIG. 1A;

FIG. 1C is a cross sectional view taken along a line Ic-Ic of FIG. 1A;

FIG. 11A is a schematic view of a rotation angle detector according to a fifth embodiment;

FIG. 11B is a cross sectional view taken along a line XIb-XIb of FIG. 11A;

FIG. 11C is a cross sectional view taken along a line XIc-XIc of FIG. 11A;

FIG. 24 is a schematic view of a comparative example of a rotation angle detector.

DETAILED DESCRIPTION OF EMBODIMENTS

Embodiments of the present invention will be described hereinafter.

First Embodiment

A rotation angle detector detects a rotation angle of a detection subject, such as an electronic throttle valve, an exhaust gas recirculation valve, and an accelerator pedal.

Figure 2:
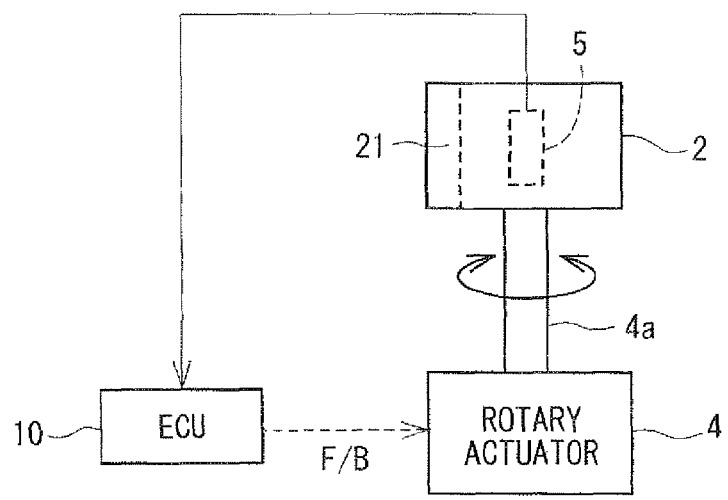
FIG. 2 is a block diagram showing a system to which a rotation angle detector is applied according to the first embodiment.

As shown in FIG. 2, a rotation angle detector 2 detecting a rotation angle of a rotating portion 4a of a rotary actuator 4 is provided with a Hail element 5 as a first magnetic detecting element. A magnet 21 for generating magnetic field is provided to the rotating portion 4a. The rotating portion 4a corresponds to a detection subject. The magnet 21 rotates along with the rotating portion 4a. The Hall element 5 detects a rotation angle of the rotating portion 4a. The detected rotation angle is transmitted to an electronic control unit (ECU) 10. The ECU 10 performs a feedback control of the rotary actuator 4 based on the rotation angle detected by the rotation angle detector 2.

Referring to FIGS. 1A to 1C, a configuration of the rotation angle detector 2 will be described hereinafter. The rotation angle detector 2 is comprised of a rectangular magnet 21, a Hall element 5 and a yoke 40 which transmits magnetic flux therethrough.

The yoke 40 is frame-shaped and is made of magnetic material. The yoke 40 has a rotational axis to rotate therearound. The yoke 40 is comprised of a first and a second walls 41, 42 which are in parallel with each other and a third and a fourth walls 43, 44 which connect the first wall 41 and the second wall 42. The third wall 43 and the fourth wall 44 are arc-shaped around the rotational axis. In other words, the third wall 43 and the fourth wall 44 are parts of a single circle.

As shown in FIGS. 1A and 1C, the rotational axis is denoted by "z-axis". An axis orthogonal to the z-axis and in parallel with the first and second walls 41, 42 is denoted by "x-axis". An axis orthogonal to the z-axis and x-axis is denoted by "y-axis". Further, an xy-plane including the x-axis and the z-axis is referred to as a reference plane "Sx", and a yz-plane including the z-axis and the y-axis is referred to as a symmetry plane "Sy".

The yoke 40 is symmetrically shaped relative to the symmetry plane "Sy". An inner surface 41a of the first wall 41 and an inner surface 42a of the second wall 42 extend in parallel with the reference plane "Sx".

The magnet 21 is disposed on the inner surface 41a of the first wall 41. The magnet 21 is symmetrically arranged relative to the symmetry plane "Sy". N-pole of the magnet 21 is in contact with the first wall 41, and S-pole of the magnet 21 confronts the second wall 42.

The Hall element 5 is arranged between the magnet 21 and the second wall 42. The Hall element 5 performs a relative rotation relative to the magnet 21 and the yoke 40 around the z-axis when the rotating portion 4a rotates. According to the first embodiment, the Hall element 5 is arranged on the z-axis. The Hall element 5 has a detection surface 5a which detects magnetic flux density.

In a case that a distance between the reference plane "Sx" and the inner surface 41a of the first wall 41 is denoted by "Y1" and a distance between the reference plane "Sx" and the inner surface 42a of the second wall 42 is denoted by "Y2", the distance "Y2" is shorter than the distance "Y1". Thus, a length "X2" of the inner surface 42a of the second wall 42 is longer than a length "X1" of the inner surface 41a of the first wall 41. Since the Hall element 5 is arranged on the z-axis, the distance "Y1" is equal to a distance between the Hall element 5 and the inner surface 41a of the first wall 41 and the distance "Y2" is equal to a distance between the Hall element 5 and the inner surface 42a of the second wall 42.

Figure 3:
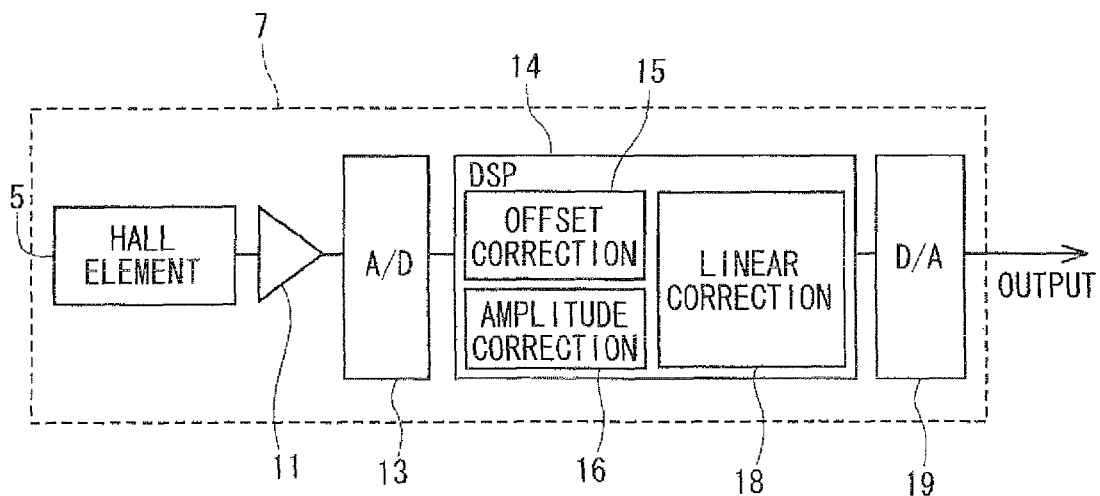
FIG. 3 is a circuit block diagram of a magnetism-detection means according to the first embodiment.

The Hall element 5 is disposed on a Hall-IC chip 7. As shown in FIG. 3, the Hall-IC chip 7 includes the Hall element 5, an amplifier circuit 11 which amplifies outputs of the Hall element 5, an A/D converter 13 which converts the amplified analog signals into digital signals, a digital signal processor (DSP) 14 which processes the converted digital signals, and a D/A converter 19 which converts the digital signals into analog signals. The Hall chip 7 corresponds to "semiconductor chip" of the present invention.

The DSP 14 includes an offset correcting circuit 15, an amplitude correction circuit 16, and a linear correction circuit 18 which linearizes the output signals of the Hall element 5 relative to a rotation angle. The linear correction circuit 18 corresponds to linear correction means of the present invention.

(Operation)

Figure 5A:
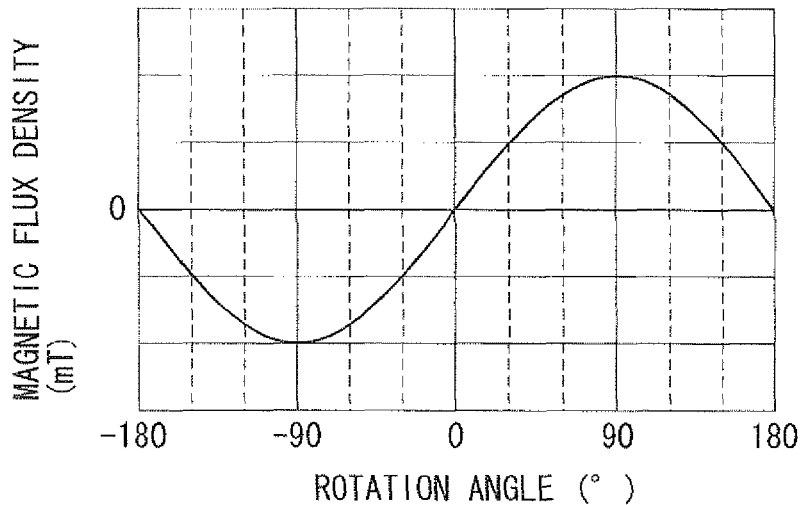
FIG. 5A is a graph showing a magnetic flux density detected by a magnetism-detection means according to the first embodiment.
Figure 5B:
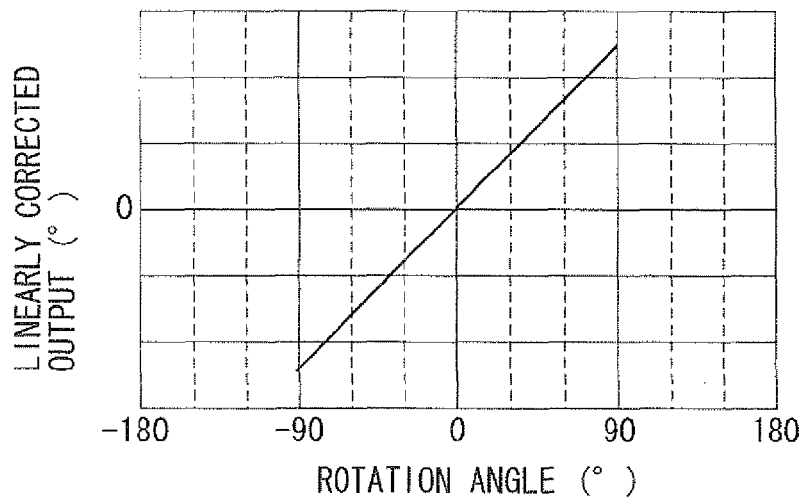
FIG. 5B is a graph showing a corrected output of the magnetism-detection means according to the first embodiment.

When the Hall element 5 relatively rotates with respect to the magnet 21 along with a rotation of the rotating portion 4a, the magnetic flux density which the detection surface 5a detects sinusoidally varies as shown in FIG. 5A. It should be noted that the rotation angle where the detected magnetic flux density is zero is defined as "rotation angle 0°". The linear correction circuit 18 linearizes the detected magnetic flux in a range of rotation angle ±90°, and outputs the linearly corrected output as shown in FIG. 5B.

Advantage of the First Embodiment

According to the first embodiment, following advantages (1) to (8) can be obtained as the first embodiment.

(1) Since the yoke 40 is frame-shaped with the z-axis therein, the yoke 40 has a shield effect against magnetic disturbances. Further, permeance of the magnetic circuit is increased and demagnetization of the magnet 21 is restricted. The magnetic flux density which the Hall element 5 detects is increased, so that the SN ratio is enhanced.

(2) Since the yoke 40 is symmetrically formed with respect to the symmetry plane "Sy", a balance of the magnetic flux is improved. Thus, the magnetic flux vector is uniformed and the robustness is enhanced. Further, since the magnet 21 is disposed on only the inner surface 41a of the first wall 41, it configuration is made simple.

(3) Since the second wall 42 extends in parallel with the first wall 41 to which the magnet 21 is provided, the magnetic flux vector is uniformed in a direction of the y-axis which is orthogonal to the first wall 41. Thus, even if the position of the Hall element 5 deviates from the original position, the detected magnetic flux density hardy change. The robustness of the rotation angle detector 2 is enhanced.

(4) The third and fourth walls 43, 44 are arc-shaped. Their center axes correspond to the z-axis. The distances between the Hall element 5 and the third and fourth walls 43, 44 are relatively long so that the magnetic flux vector is less curved, whereby the magnetic flux vector is uniformed and the robustness is enhanced. Further, an exterior of the yoke 40 is formed in such a manner as to correspond to a rotation radius, whereby a space-efficiency is improved.

(5) The distance between the Hall element 5 and the inner surface 42a of the second wall 42 is shorter than that between the Hall element 5 and the inner surface 41a of the first wall 41. The length "X2" of the inner surface 42a is longer than the length "X1" of the inner surface 41a. Therefore, at a vicinity of the Hall element 5, the area in which the magnetic flux vector is uniformed can be enlarged. The magnetic vector is more uniformed and the robustness is enhanced.

(6) The magnet 21 is rectangularly shaped. Dispersion in manufacturing and assembling can be restricted. Thus, the magnetic flux vector is more uniformed and the robustness is enhanced with respect to a deviation in position. Since the shape of the magnet 21 is simple, the manufacturing cost can be reduced.

(7) Since the linear correction circuit 18 linearly corrects the magnetic flux density detected by the Hall element 5, the linearity of the detected magnetic flux density can be improved.

(8) The Hall element 5 and the linear correction circuit 18 are configured as a single Hall IC chip 7. Thus, the magnetic detecting means can reduce its size.

Comparative Example

A comparative example which is a combination of prior arts shown in JP-2007-256121A and JP-2003-177004A will be described hereinafter. As shown in FIG. 24, an annular yoke 48 and another yoke 49 provided to an inner surface of the annular yoke 48 form a magnetic-flux-transmitting means. A magnet 29 is also provided to the inner surface of the annular yoke 48 in such a manner as to confront another yoke 49. The Hall element 5 is arranged on a rotational axis between the magnet 29 and the yoke 49.

If the annular yoke 48 is not provided, a straight magnetic flux is generated between the magnet 29 and the yoke 49. However, this magnetic flux is easily disturbed by a disturbance magnetic field. Meanwhile, in a case that the annular yoke 48 is provided as shown in FIG. 24, although the magnetic flux is less disturbed by the disturbance magnetic field, the magnetic flux vector is curved due to a magnetic flux leakage from an inner surface of the annular yoke 48. The magnetic flux vector becomes less uniform. If the position of the Hall element 5 deviates, the detected magnetic flux density is also varied, so that the detection characteristic can not be maintained. That is, the robustness is deteriorated.

According to the first embodiment, since the yoke 40 has the first wall 41 to which the magnet 21 is provided and the second wall 42 in parallel with the first wall 41, the magnetic flux vector is uniformed in a direction of the y-axis which is orthogonal to the first wall 41. Therefore, even if the position of the Hall element 5 deviates, the detected magnetic flux density is less varied. The robustness with respect to the positional deviation is enhanced, unlike the above comparative example.

Referring to drawings, a second to a fourth embodiment will be described hereinafter. The substantially same parts and the components as the first embodiment are indicated with the same reference numeral and the same description will not be reiterated.

Second Embodiment

Figure 4:
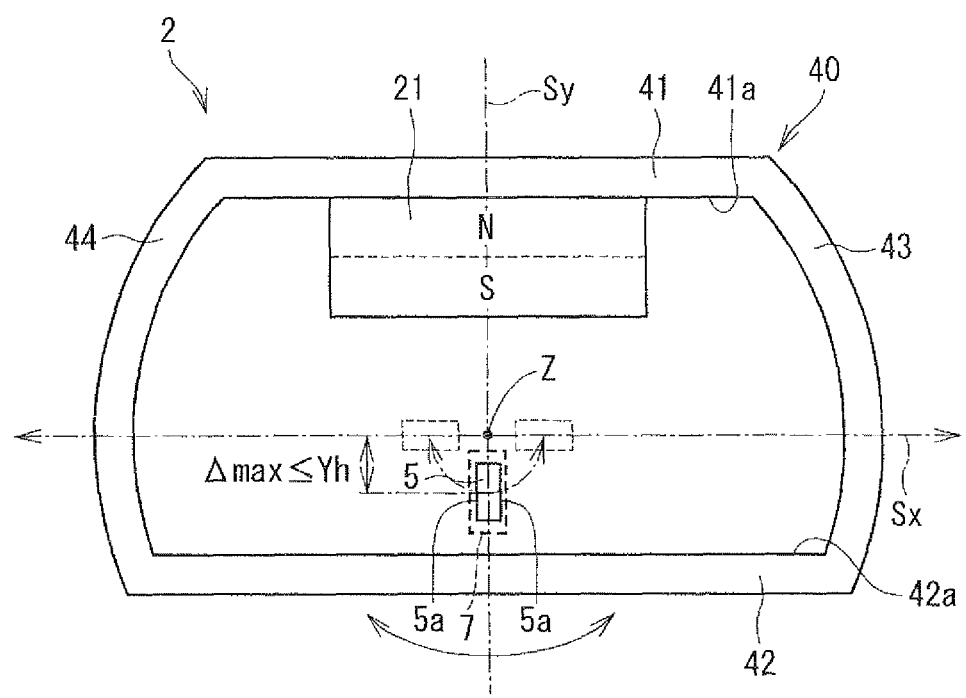
FIG. 4 is a schematic view of a rotation angle detector according to a second embodiment.

As shown in FIG. 4, according to a second embodiment, the rotation angle detector 2 has the Hall element 5 which deviates from the z-axis toward the second wall 42 by a specified distance "Yh". It should be noted that the specified distance "Yh" is greater than an upper value Δmax of manufacturing and assembling tolerance.

Thereby, the locus of relative rotation of the Hall element 5 in a range of ±90° is always included in a region adjacent to the second wall 42 relative to the z-axis. Since the magnetic flux density is detected in a region where the magnetic flux vector is most uniformed, the robustness is significantly enhanced.

Also, the second embodiment has the same advantages as the first embodiment.

Figure 5C:
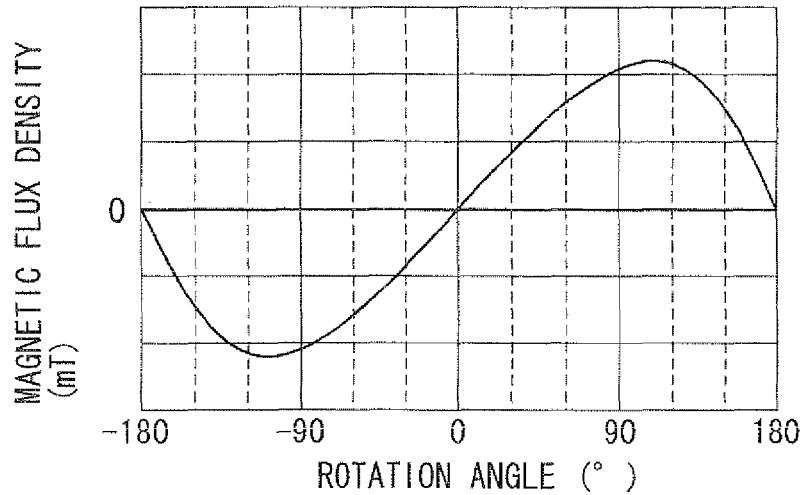
FIG. 5C is a graph showing a magnetic flux density detected by a magnetism-detection means according to the second embodiment.

The magnetic flux density detected by the Hall element 5 is indicated by a waveform shown in FIG. 5C. In this waveform, the variation in the detected magnetic flux density becomes more linear in a rotation angle range of −90° to +90° rather than the accurate sine wave.

Third Embodiment

Figure 6:
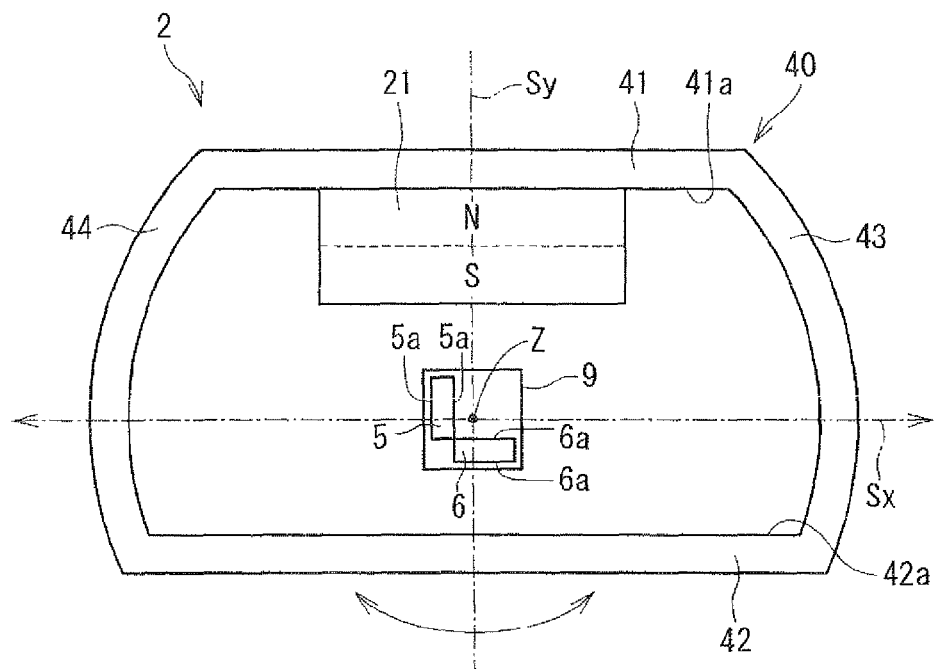
FIG. 6 is a schematic view of a rotation angle detector according to a third embodiment.

According to a third embodiment, as shown in FIG. 6, two Hall elements are provided. A first Hall element 5 and a second Hall element 6 are arranged close to each other in a single Hall IC chip 9. A detection surface 5a of the first Hall element 5 and a detection surface 6a of the second Hall element 6 make a specified angle "α" therebetween. The Hall IC chip 9 corresponds to "semiconductor chip" of the present invention.

Figure 7:
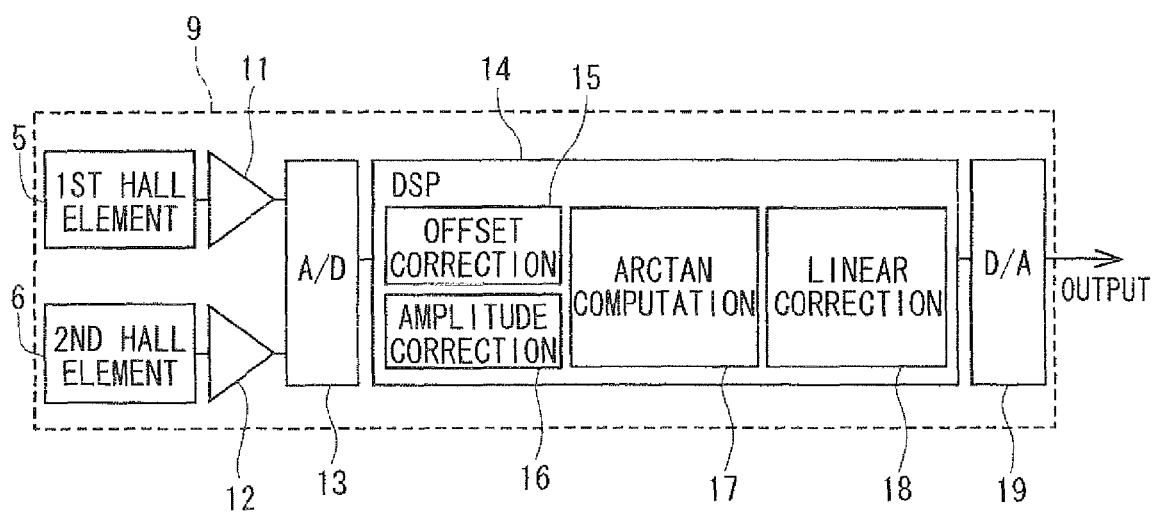
FIG. 7 is a circuit block diagram of a magnetism-detection means according to the third embodiment.

As shown in FIG. 7, the Hall-IC chip 9 includes, the first Hall element 5, the second Hall element 6, a first amplifier circuit 11 which amplifies outputs of the first Hall element 5, a second amplifier circuit 12 which amplifies outputs of the second Hall element 6, an A/D converter 13 which converts the amplified two analog signals into digital signals, a digital signal processor (DSP) 14 which processes the converted two digital signals, and a D/A converter 19 which converts the digital signals into analog signals.

The DSP 14 includes an offset correction circuit 15, an amplitude correction circuit 16, a computation circuit 17 which performs trigonometric-function computation with respect to the detection signals of the first Hall element 5 and the second Hall element 6, and a linear correction circuit 18 which linearizes the computed angle computed by the computation circuit 17 with respect to the rotation angle. The computation circuit 17 corresponds to a computing means of the present invention.

The trigonometric-function computation which the computation circuit 17 performs will be described hereinafter. Reference signs are defined as follows:

V1: Output Voltage of first Hall element 5 (mV),
V2: Output Voltage of second Hall element 6 (mV),
K(t): Hall coefficient,
I(t): Hall current (mA),
B(t): Maximum value (½ of the amplitude of the sine wave) of the magnetic flux density which can be detected,
B1(t): Magnetic flux density (mT) detected by the first Hall element 5,
B2(t): Magnetic flux density (mT) detected by the second Hall element 6,
θ: Rotation angle)(°), θ(°)=πθ/180(rad),
α=γ−β: Differential phase)(°) between the first Hall element 5 and the second Hall element 6,
β: Differential phase)(°) between the first Hall element 5 and a reference angle, and
γ: Differential phase)(°) between the second Hall element 6 and a reference angle. It should be noted that "(t)" represents that the reference sign has a temperature characteristic with respect to an ambient temperature "t".

Output voltage "V1" of the first Hall element 5 and output voltage "V2" of the second Hall element 6 are expressed by following formulas.

$$V1 = K(t) \cdot I(t) \cdot B1(t) \quad (1)$$
$$= K(t) \cdot I(t) \cdot B(t) \cdot \sin(\theta - \beta)$$

$$V2 = K(t) \cdot I(t) \cdot B2(t) \quad (2)$$
$$= K(t) \cdot I(t) \cdot B(t) \cdot \sin(\theta - \gamma)$$

As above, the output voltage of the first and the second Hall element 5, 6 depend on the ambient temperature "t". If the output voltage "V" is corrected based on the ambient temperature "t", the Hall coefficient K(t), the Hall current I(t) and the magnetic flux density B(t), a complicated correction circuit is necessary.

So, following formulas (3), (4) are derived from the above formulas (1), (2). The following formulas (3), (4) have no term depending on the ambient temperature "t".

$$\theta = (180/\pi) \times \arctan\{\cot(\pi \cdot \alpha/360) \cdot Cv\} \quad (3)$$

$$Cv = (V1-V2)/(V1+V2) \quad (4)$$

In the case that α=90°, following formula (5) is established, $$\theta = (180/\pi) \times \arctan(V1/V2) \quad (5)$$

A computed angle is obtained by adding an offset quantity to the above computed result according to the differential phase α.

Figure 8A:
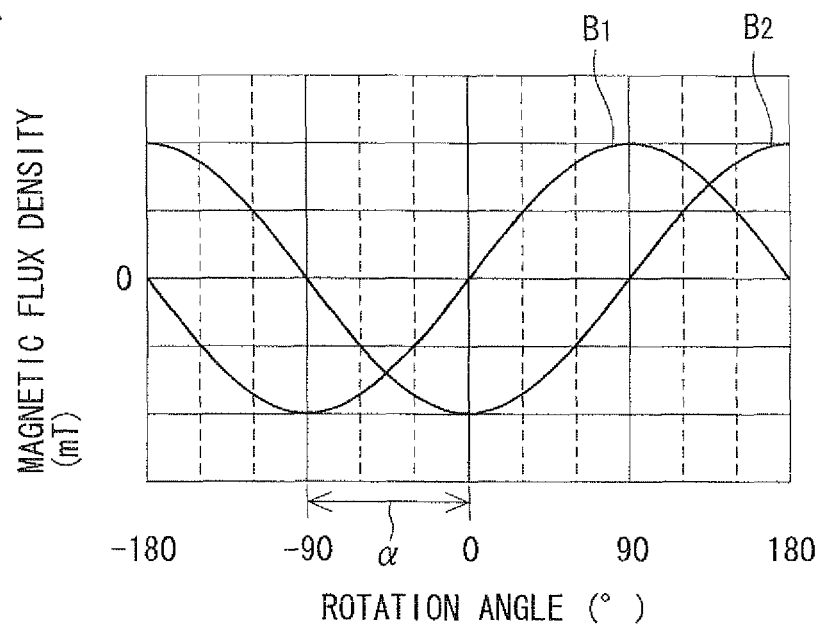
FIG. 8A is a graph showing a magnetic flux density detected by a magnetism-detection means according to a third embodiment.
Figure 8B:
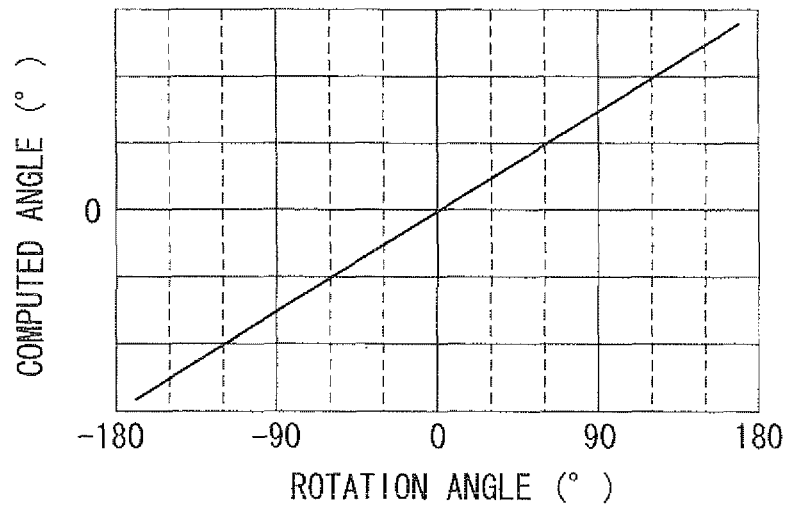
FIG. 8B is a graph showing a computed angle according to a trigonometric-function computation.

FIGS. 8A and 8B are characteristic charts according to the third embodiment. In FIG. 8A, it is defined that β=0°, γ=90°. The detected magnetic flux density B2 of the second Hall element 6 is represented by a sine wave which is retarded by α=90° relative to another sine wave representing the detected magnetic flux density B1 of the first Hall element 5. The computation circuit 17 computes the computation angle based on the detected magnetic flux densities B1, B2 as shown in FIG. 8B.

Advantages of the Third Embodiment

According to the third embodiment, following advantages (7) to (8) can be obtained in addition to the above advantages (1) to (6) of the first embodiment.

(7) Two Hall elements 5, 6 are provided and the computation circuit 17 performs trigonometric-function operation, whereby the temperature characteristic of the output voltage "V" can be canceled, so that the rotation angle can be accurately detected with simple configuration. Since the linear correction circuit 18 linearly corrects the computation angle, the linearity of the detected magnetic flux density can be improved.

(8) The first Hall element 5, the second Hall element 6, the computation circuit 17 and the linear correction circuit 18 are configured as a single Hall IC chip 9. Thereby, since the first Hall element 5 and the second Hall element 6 are arranged close to each other, the ambient temperature "t" and magnetic characteristics are made substantially the same therebetween. The rotation angle can be detected more accurately. The size of the magnetic detecting means can be smaller.

Fourth Embodiment

Figure 9:
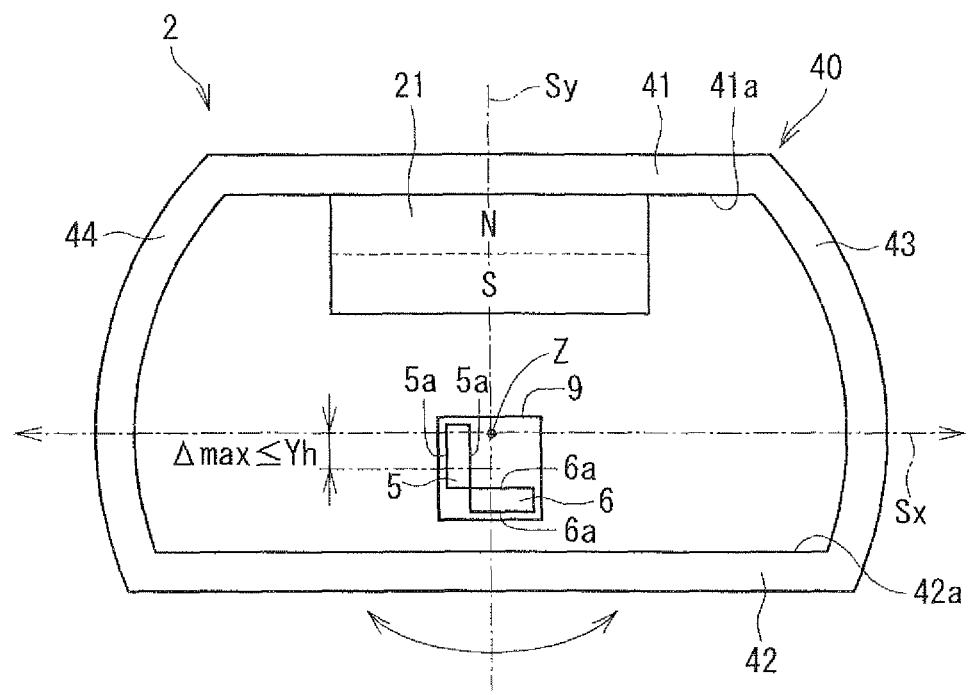
FIG. 9 is a schematic view of a rotation angle detector according to a fourth embodiment.

As shown in FIG. 9, according to a fourth embodiment, the Hall IC chip 9 deviates from the z-axis toward the second wall 42 by a specified distance "Yh" with respect to the third embodiment. The configuration of the Hall IC chip 9 is the same as that of the third embodiment, and the specified distance "Yh" is established in the same way as the second embodiment.

Figure 10A:
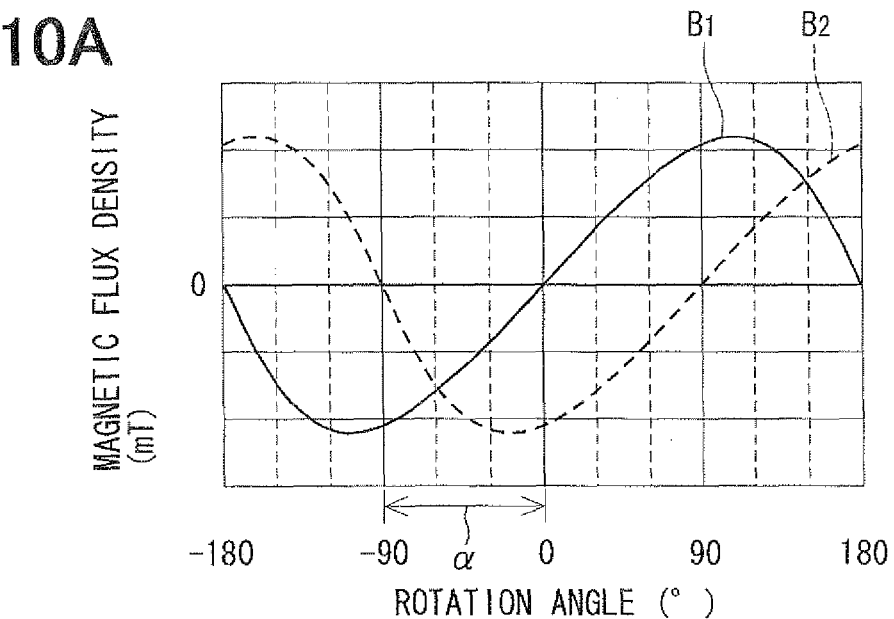
FIG. 10A is a graph showing a magnetic flux density detected by a magnetism-detection means according to a fourth embodiment.
Figure 10B:
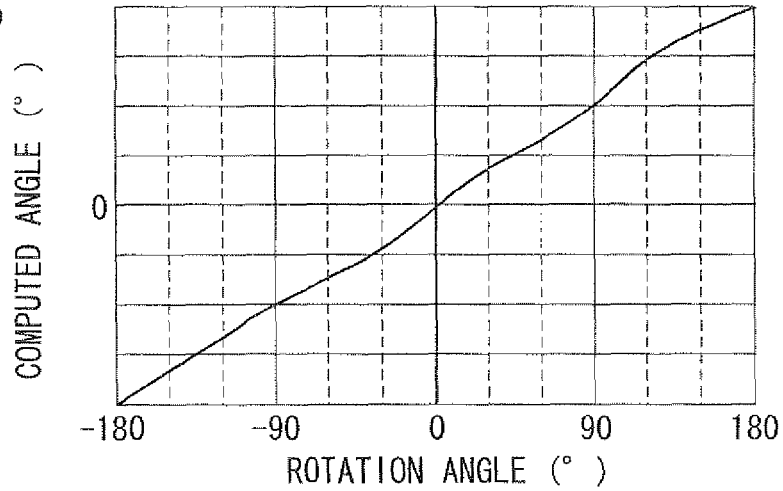
FIG. 10B is a graph showing a computed angle according to a trigonometric-function computation.
Figure 10C:
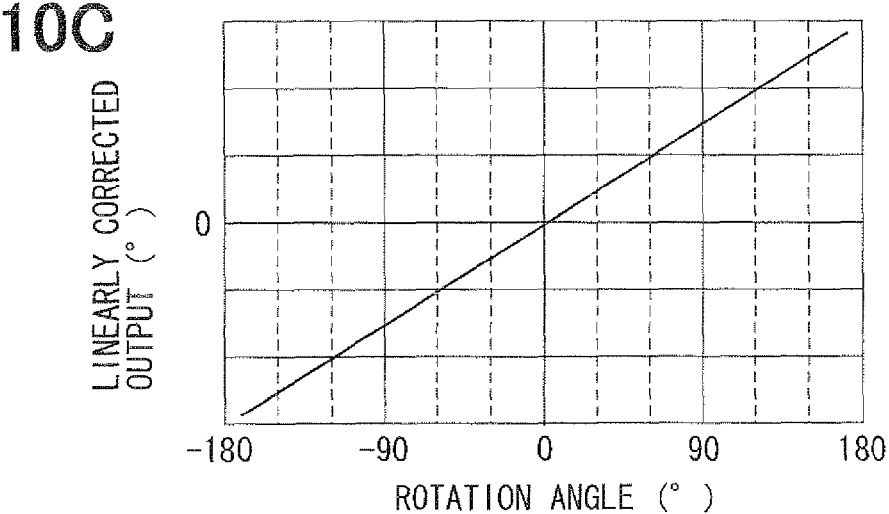
FIG. 10C is a graph showing a linearly corrected output.

FIGS. 10A to 10C are characteristic charts according to the fourth embodiment. In FIG. 10A, it is defined that β=0°, γ=90°. The detected magnetic flux B2 of the second Hall element 6 is represented by a sine wave which is retarded by α=90° relative to another sine wave representing the detected magnetic flux B1 of the first Hall element 5. In this waveform, the variation in the detected magnetic flux density becomes more linear in a rotation angle range of −90° to +90° rather than the accurate sine wave.

The computation circuit 17 computes the computation angle based on the detected magnetic flux densities B1, B2 as shown in FIG. 10B. Further, the linear correction circuit 18 linearly corrects the computation angle to output the linearly corrected output as shown in FIG. 10C. The fourth embodiment has the same advantages as the third embodiment.

Fifth Embodiment

As shown in FIG. 11, according to a fifth embodiment, the rotation angle detector 2 is provided with a first magnet 211 and a second magnet 212. The first and the second magnet 211, 212 are arranged on the inner surface 41a of the first wall 41 symmetrically with respect to the symmetry plane "Sy". Each N-pole of the first and the second magnet 211, 212 is in contact with the first wall 41, and each S-pole of the magnets 211, 212 confronts the second wall 42. The Hall element 5 is arranged on the z-axis.

A distance "Y2" between the reference plane "Sx" and the inner surface 42a of the second wall 42 is shorter than a distance "Y1" between the reference plane "Sx" and the inner surface 41a of the first wall 41. The length "X2" of the inner surface 42a is longer than the length "X1" of the inner surface 41a. Since the inner surface 41a of the first wall 41 and the inner surface 42a of the second wall 42 extends in parallel with the reference plane "Sx", the distance "Y1" corresponds to a distance "D1" between the z-axis and the inner surface 41a of the first wall 41 and the distance "Y2" corresponds to a distance "D2" between the z-axis and the inner surface 42a of the second wall 42.

The first wall 41 is comprised of a right-half wall 411 on which the first magnet 211 is disposed and a left-half wall 412 on which the second magnet 212 is disposed. The first magnet 211 is magnetized in a direction orthogonal to the right-half wall 411, and the second magnet 212 is magnetized in a direction orthogonal to the left-half wall 412. An inner surface 411a of the right-half wall 411 and an inner surface 412a of the left-half wall 412 are continuous plane which is parallel to the reference plane "Sx".

In the first embodiment, since the detector 2 is provided with a single magnet 21, the magnetic flux vector is uniformed in a direction of y-axis. However, at vicinities of the third wall 43 and the fourth wall 44, which is encircled by "P1" in FIG. 1, the magnetic flux vector is curved. Meanwhile, according to the fifth embodiment, since two magnets 211, 212 are provided, the area where the magnetic flux vector is uniformed in a direction of y-axis can be enlarged, which is encircled by "P2" in FIG. 11. Thus, the robustness is further enhanced.

Sixth Embodiment

Figure 12:
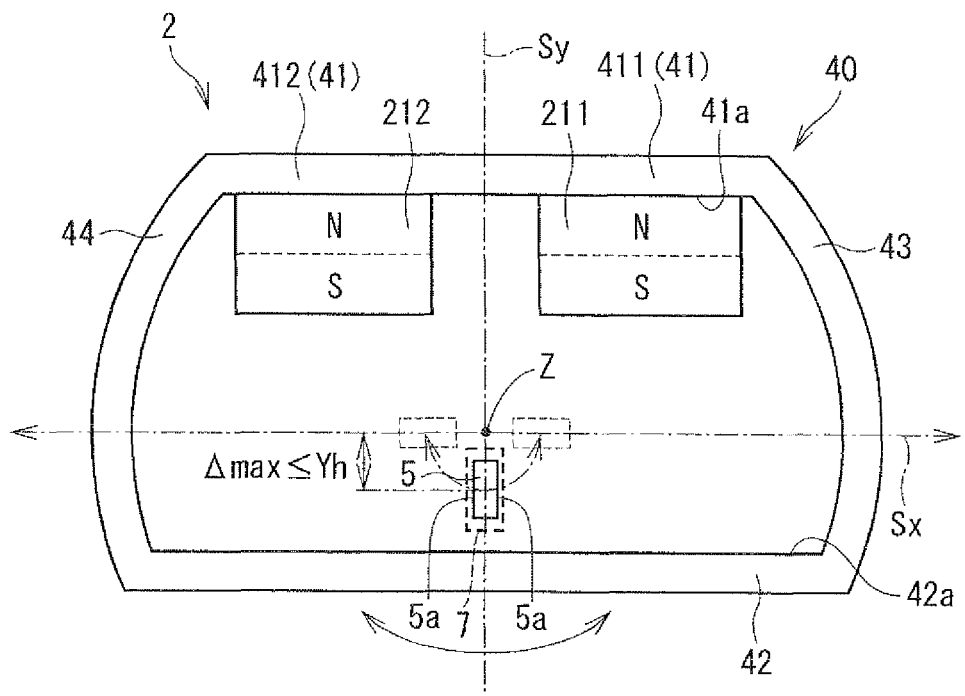
FIG. 12 is a schematic view of a rotation angle detector according to a sixth embodiment.

As shown in FIG. 12, according to a sixth embodiment, the Hall element 5 deviates from the z-axis toward the second wall 42 by a specified distance "Yh". Thereby, the locus of relative rotation of the Hall element 5 in a range of ±90° is always included in a region adjacent to the second wall 42 relative to the z-axis. Since the magnetic flux density is detected in a region where the magnetic flux vector is most uniformed, the robustness is significantly enhanced.

Seventh Embodiment

Figure 13:
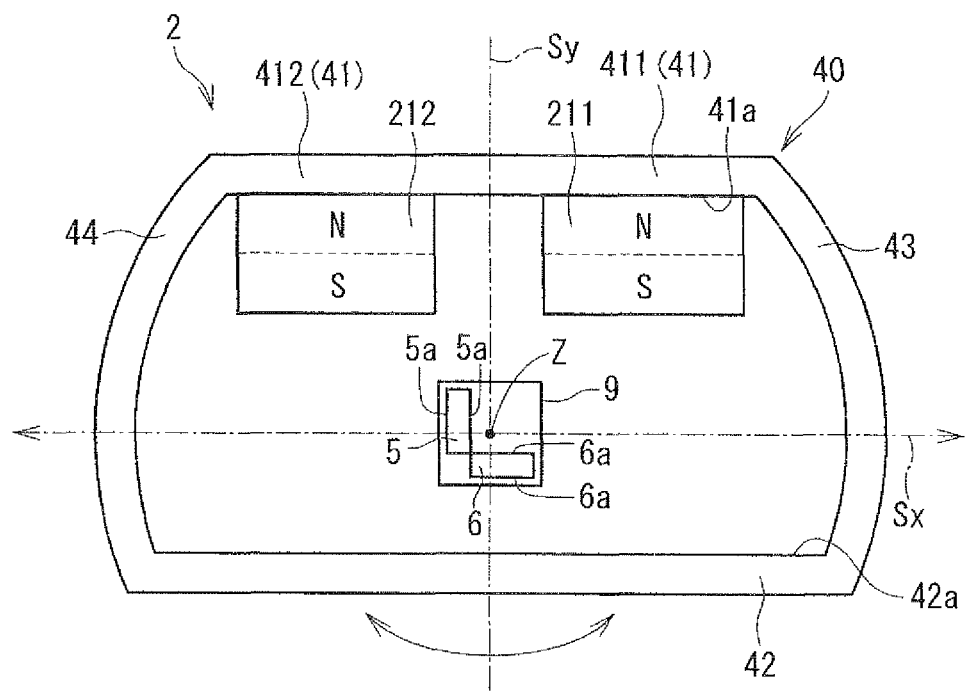
FIG. 13 is a schematic view of a rotation angle detector according to a seventh embodiment.

As shown in FIG. 13, according to a seventh embodiment, a magnetic detecting means including two Hall elements 5, 6 are provided on the z-axis, so that the rotation angle can be accurately detected by performing trigonometric-function computation.

Eighth Embodiment

Figure 14:
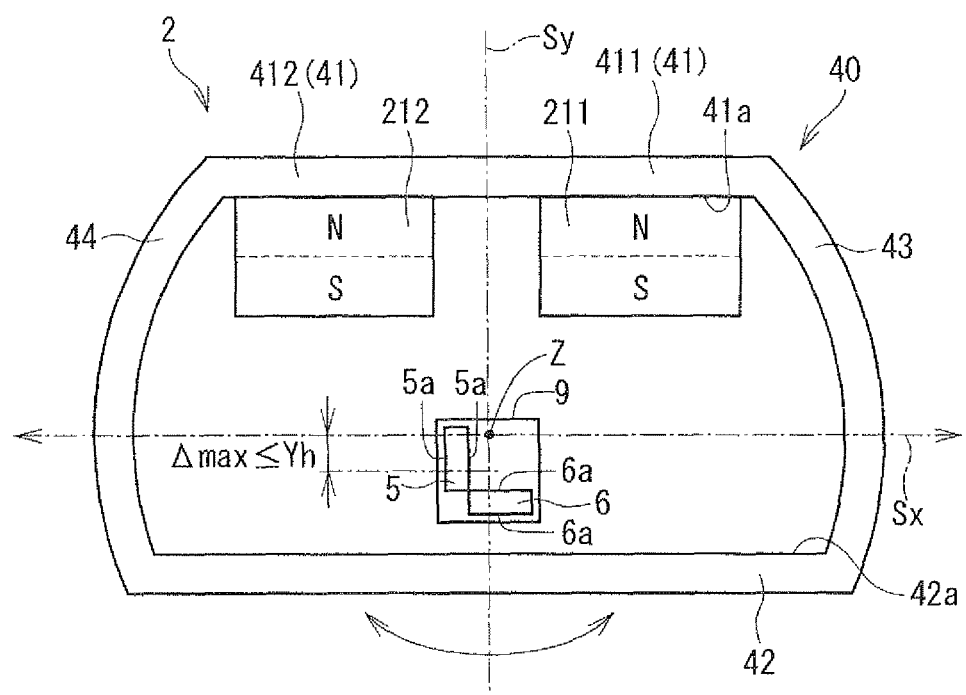
FIG. 14 is a schematic view of a rotation angle detector according to an eighth embodiment.

As shown in FIG. 14, according to an eighth embodiment, a magnetic detecting means including two Hall elements 5, 6 deviates from the z-axis toward the second wall 42 by a specified distance "Yh". Thereby, the eighth embodiment has the advantages of the sixth and seventh embodiments.

In the following ninth to fourteenth embodiments, the first wall 41 is comprised of a right-half wall 411 and a left-half wall 412 which are inclined relative to the reference plane "Sx".

Ninth Embodiment

Figure 15A:
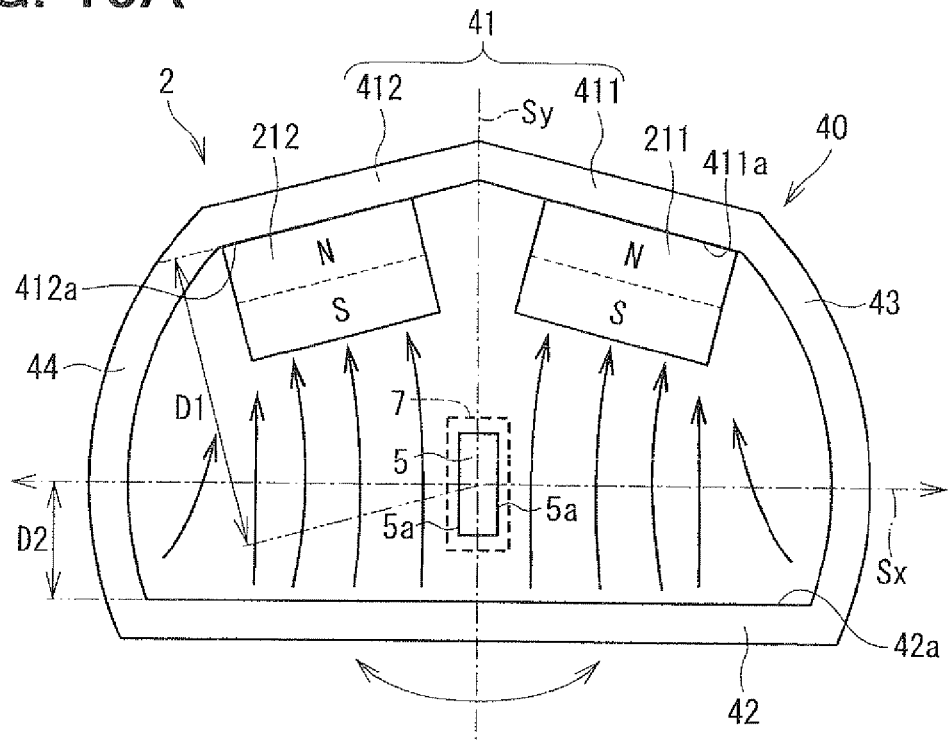
FIG. 15A is a schematic view of a rotation angle detector according to a ninth embodiment.

As shown in FIG. 15A, according to a ninth embodiment, the first wall 41 is radially outwardly convex. That is, the right-half wall 411 and the left-half wall 412 are inclined relative to the reference plane "Sx" in such a manner that the walls 411, 412 are apart from the reference plane "Sx" toward the symmetry plane "Sy". The second wall 42 is formed in parallel with the reference plane "Sx".

Thereby, the curved magnetic flux vector, which is apart from the symmetry plane "Sy", is corrected in a direction of the y-axis. The area where the magnetic flux vector is uniformed in a direction of the y-axis is enlarged. Thus, the robustness is further enhanced in entire rotation angle of the detection subject.

A distance "D2" between the z-axis and the inner surface 42a of the second wall 42 is shorter than a distance "D1" between the z-axis and the inner surface 411a of the right-half wall 411 or the inner surface 412a of the left-half wall 412. Therefore, at a vicinity of the Hall element 5, the area in which the magnetic flux vector is uniformed can be enlarged and the robustness is enhanced. It should be noted that the distance "D2" in the present embodiment corresponds to the distance "Y2" (FIG. 11) of the fifth embodiment.

Tenth Embodiment

Figure 15B:
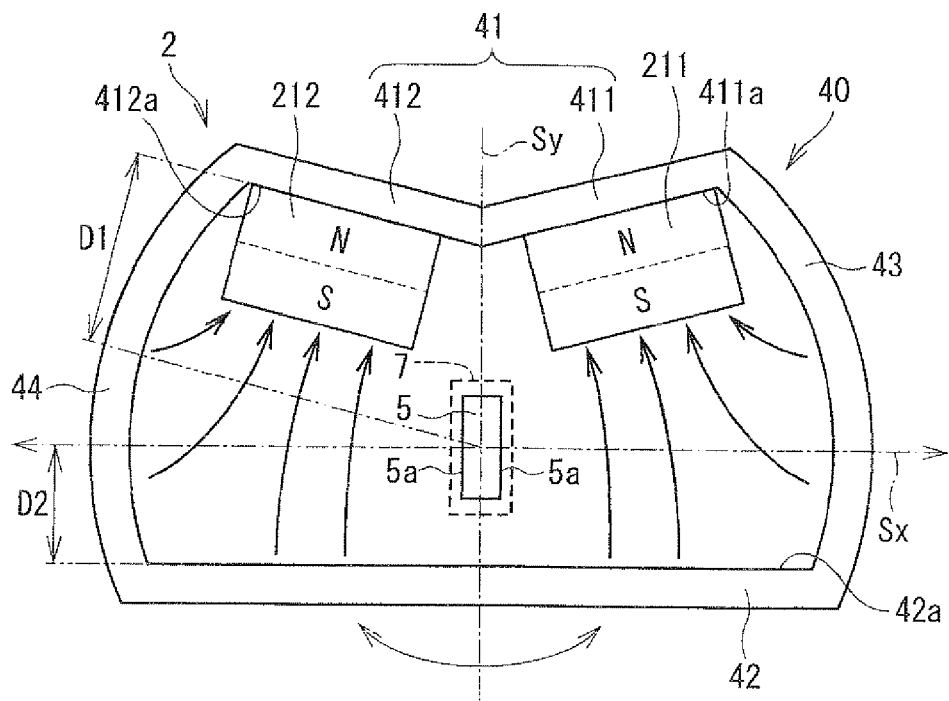
FIG. 15B is a schematic view of a rotation angle detector according to a tenth embodiment.

As shown in FIG. 15B, according to a tenth embodiment, the first wall 41 is radially inwardly concaved. That is, the right-half wall 411 and the left-half wall 412 are inclined relative to the reference plane "Sx" in such a manner that the walls 411, 412 are close to the reference plane "Sx" toward the symmetry plane "Sy". The second wall 42 is formed in parallel with the reference plane "Sx".

According to the above configuration, the magnetic flux vector, which is apart from the symmetry plane "Sy", is further curved. However, by utilizing this curved magnetic flux vector, the magnetic flux less passes through the detection surface 5a of the Hall element 5 at a position where the magnetic flux is relatively high and the magnetic flux easily passes through the detection surface 5a of the Hall element 5 at a position where the magnetic flux is relatively low, whereby a detection balance is improved.

Further, since the distance "D2" is shorter than the distance "D1", the magnetic flux vector can be more uniformed at a vicinity of the Hall element 5. The robustness is also enhanced.

Eleventh to Fourteenth Embodiments

According to an eleventh to a fourteenth embodiments, the second wall 42 is comprised of a right-half wall 421 and a left-half wall 422 which are symmetric with respect to the symmetry plane "Sy". An inner surface 421a of the right-half wall 421 and an inner surface 422a of the left-half wall 422 are inclined relative to the reference plane "Sx".

Figure 16A:
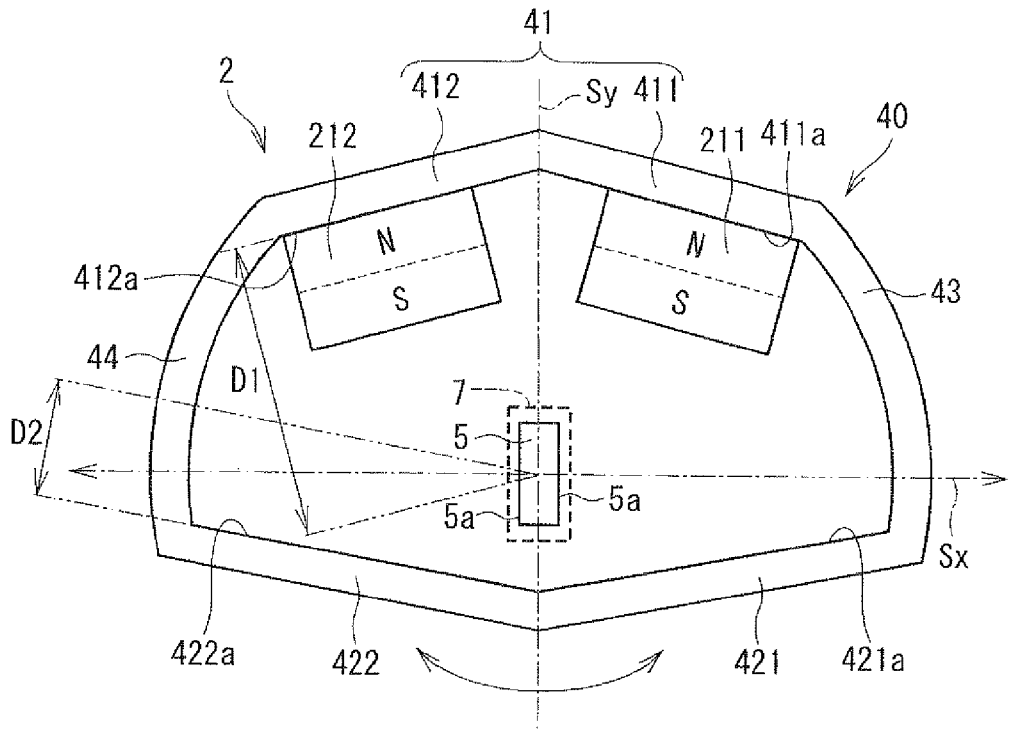
FIG. 16A is a schematic view of a rotation angle detector according to an eleventh embodiment.

As shown in FIG. 16A, an eleventh embodiment is a modification of the ninth embodiment, in which the second wall 42 is radially outwardly convex. That is, the right-half wall 421 and the left-half wall 422 are inclined relative to the reference plane "Sx" in such a manner that the walls 421, 422 are apart from the reference plane "Sx" toward the symmetry plane "Sy".

As shown in FIG. 15B, a twelfth embodiment is a modification of the tenth embodiment, in which the second wall 42 is radially inwardly convex.

Figure 17A:
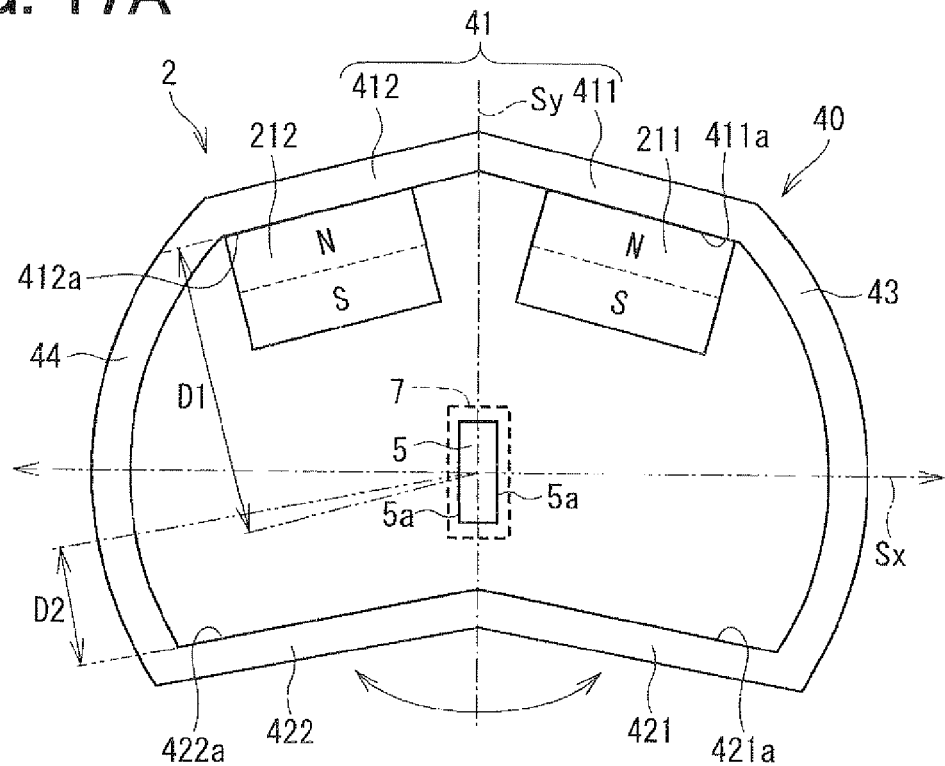
FIG. 17A is a schematic view of a rotation angle detector according to a thirteenth embodiment.

As shown in FIG. 17A, a thirteenth embodiment is a modification of a ninth embodiment, in which the second wall 42 is radially inwardly concaved. That is, the right-half wall 421 and the left-half wall 422 are inclined relative to the reference plane "Sx" in such a manner that the inner surfaces 421a, 422a are close to the reference plane "Sx" toward the symmetry plane "Sy".

Figure 17B:
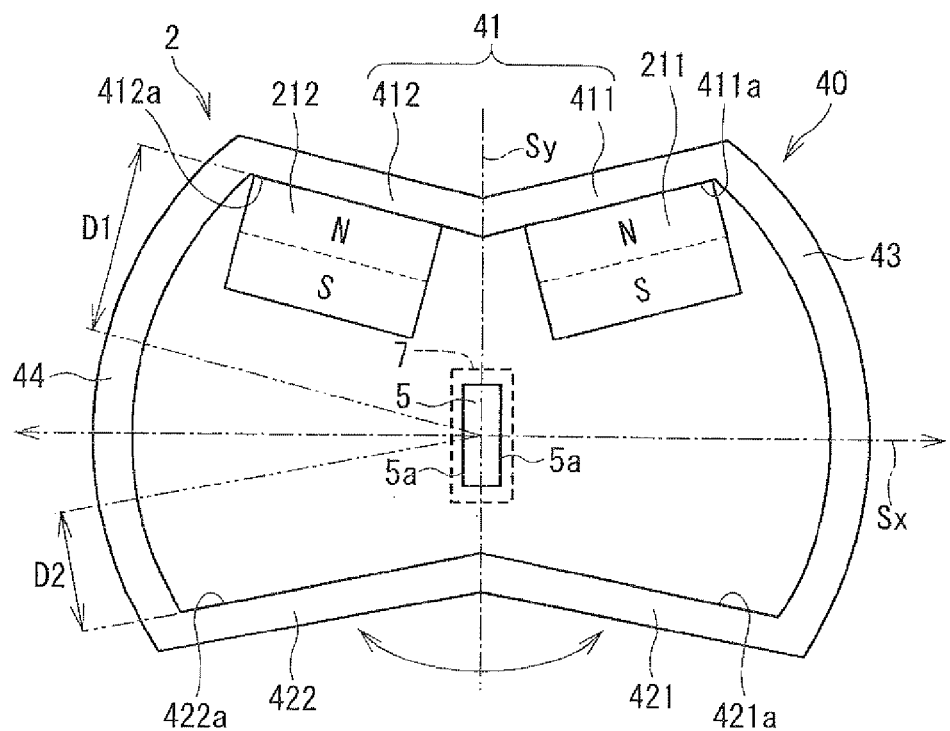
FIG. 17B is a schematic view of a rotation angle detector according to a fourteenth embodiment.

As shown in FIG. 17B, according to a fourteenth embodiment, the second wall 42 is radially inwardly concaved.

According to the eleventh to the fourteenth embodiment, the magnetic flux vector is further uniformed and the detection balance of the magnetism-detection element can be precisely adjusted.

Further, in each embodiment, the distance "D2" is shorter than the distance "D1". Therefore, at a vicinity of the Hall element 5, the area in which the magnetic flux vector is uniformed can be enlarged and the robustness is enhanced.

Other Embodiments (a) In the above embodiments, each N-pole of the magnets 21, 211, 212 is in contact with the first wall 41, 411, 412. Alternatively, the magnets 21, 211, 212 can be arranged in such a manner that each S-pole of the magnets is in contact with the first wall 41, 411, 412.

Figure 18:
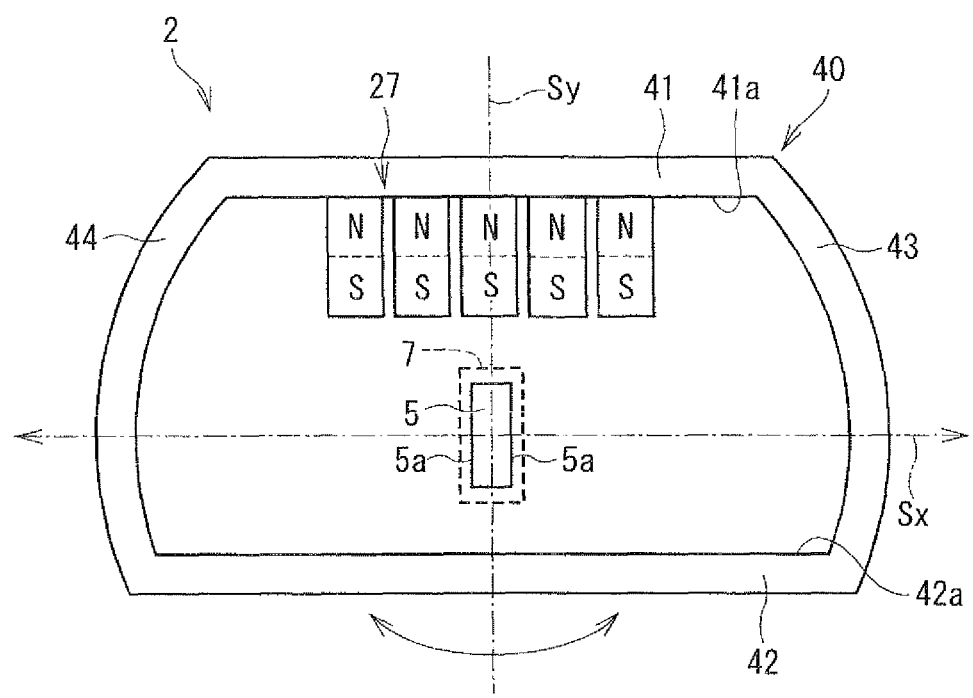
FIG. 18 is a schematic view of a rotation angle detector according to another embodiment.
Figure 21:
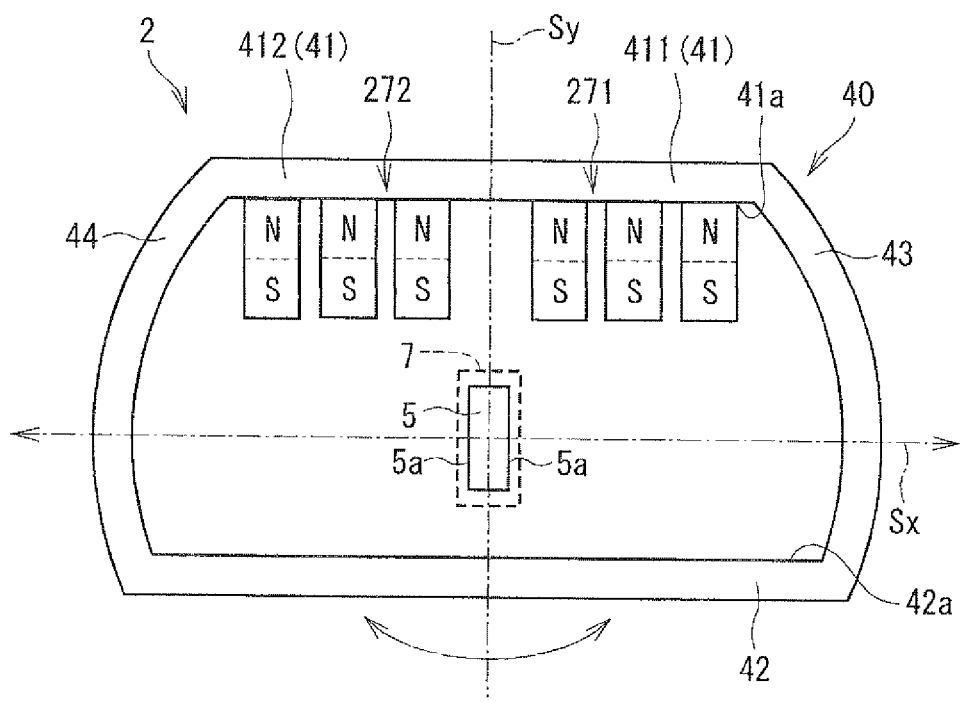
FIG. 21 is a schematic view of a rotation angle detector according to another embodiment.

(b) As shown in FIG. 18, the magnet can be divided into a plurality of magnet pieces 27. Alternatively, as shown in FIG. 21, two groups of divided magnets 271, 272 can be provided.

Figure 19A:
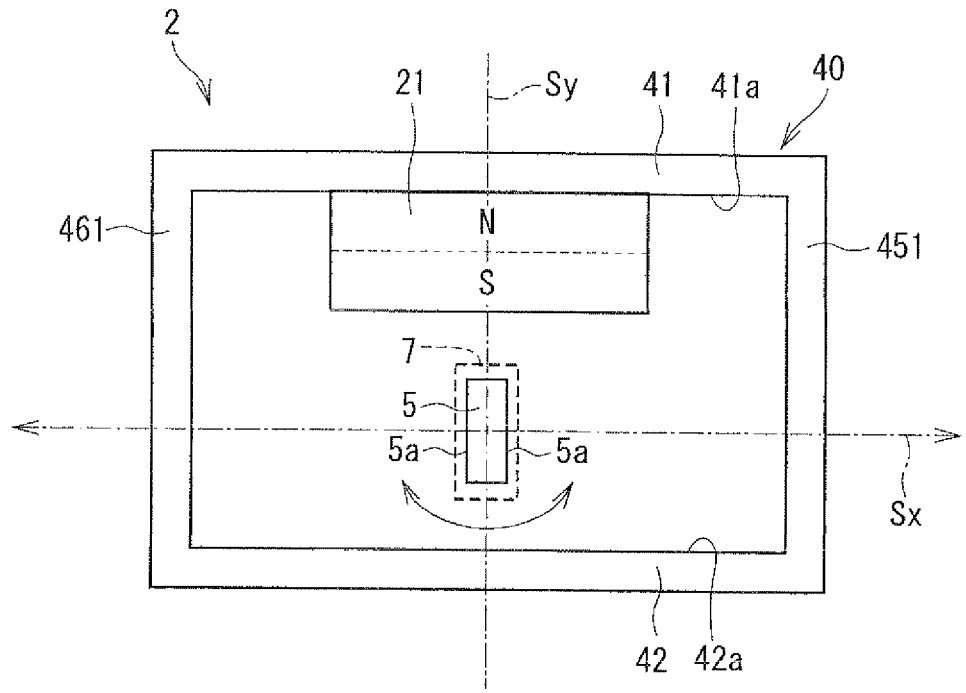
FIG. 19A is a schematic view of a rotation angle detector according to another embodiment.
Figure 19B:
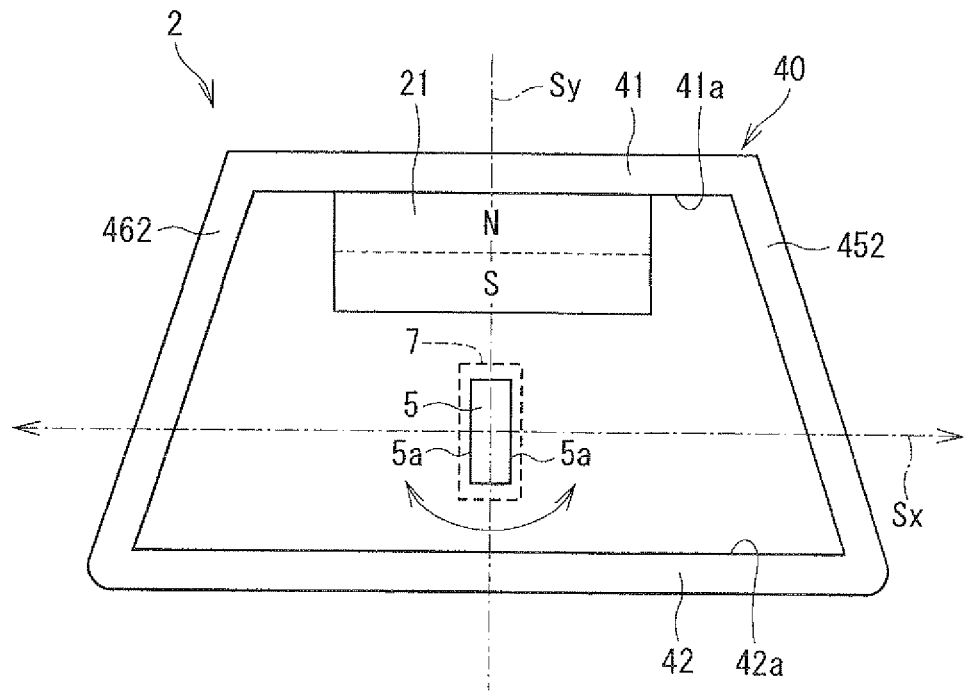
FIG. 19B is a schematic view of a rotation angle detector according to another embodiment.
Figure 22A:
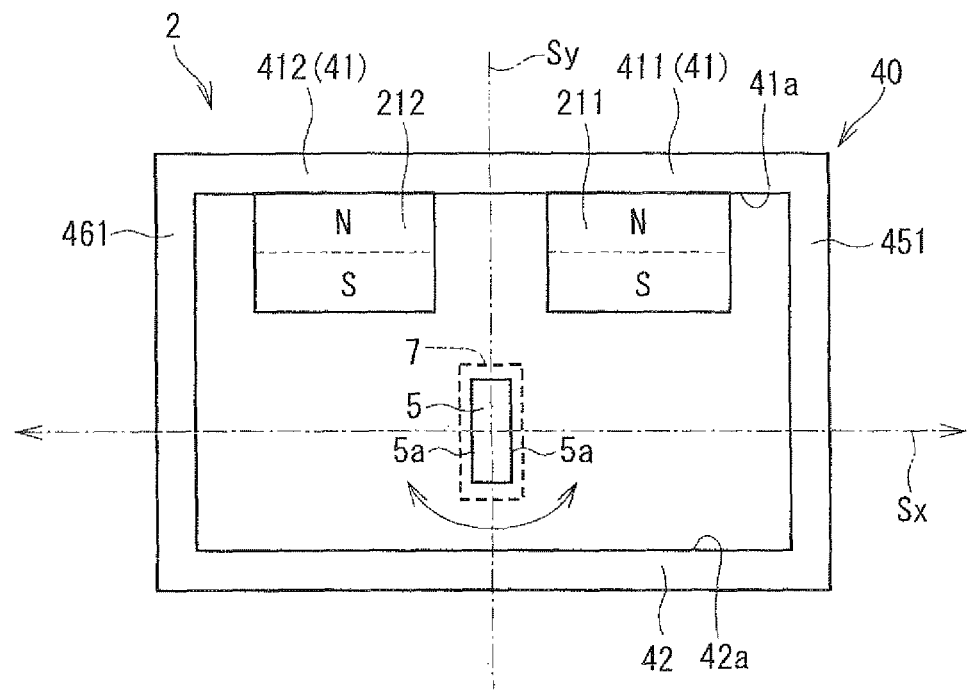
FIG. 22A is a schematic view of a rotation angle detector according to another embodiment.
Figure 22B:
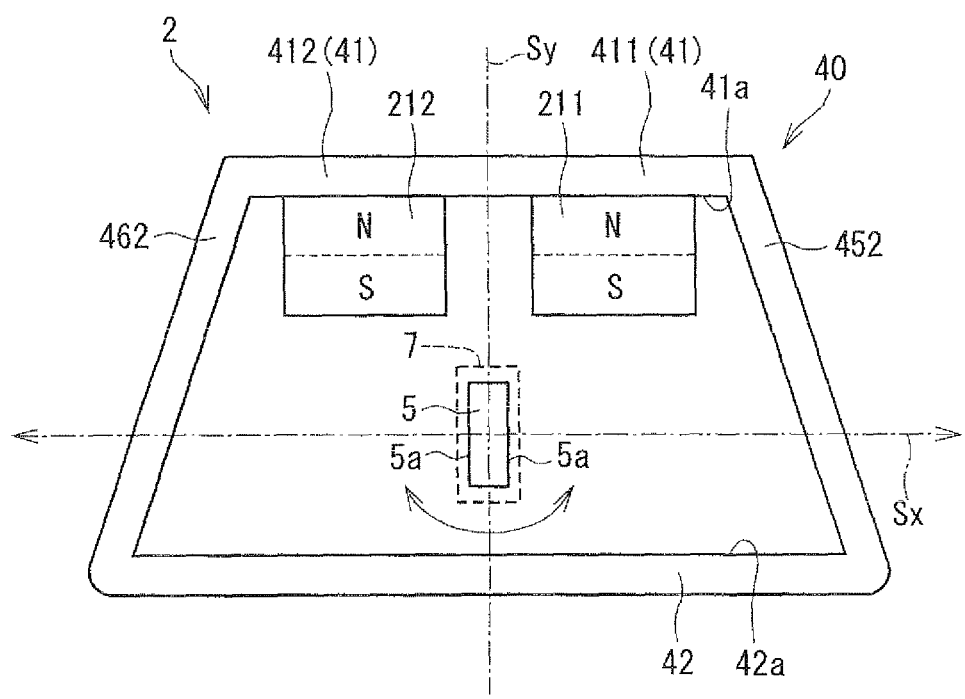
FIG. 22B is a schematic view of a rotation angle detector according to another embodiment.

(c) The third wall and the fourth wall of the yoke 40 are not limited to ark-shape. As shown in FIG. 19A and FIG. 22A, the yoke 40 can be rectangle-shaped. Alternatively, as shown in FIG. 19B and FIG. 22B, the yoke 40 can be trapezoidal-shaped.

Figure 20:
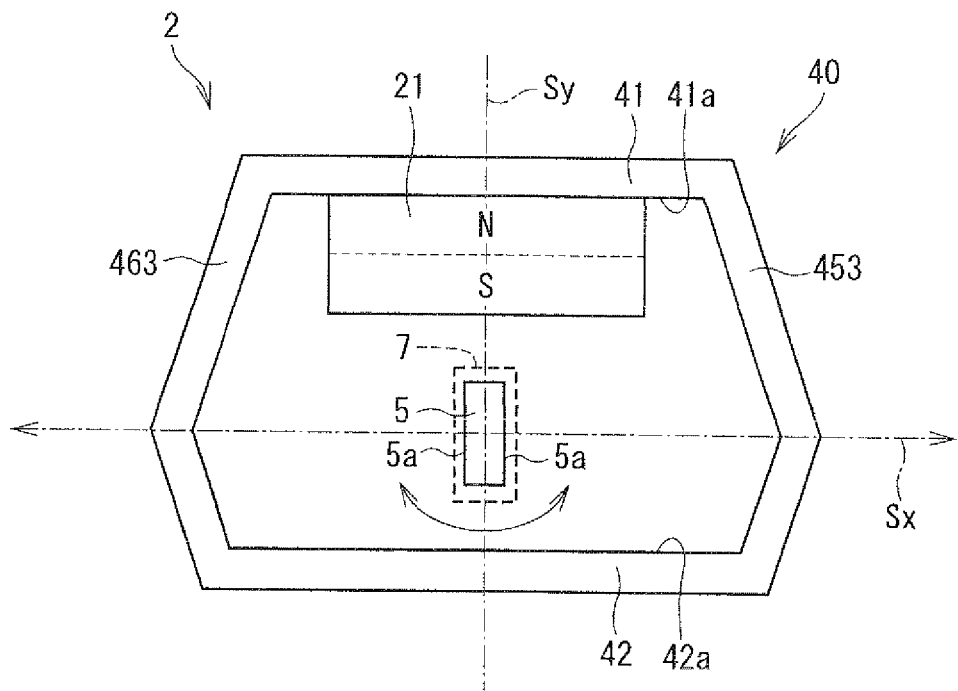
FIG. 20 is a schematic view of a rotation angle detector according to another embodiment.
Figure 23:
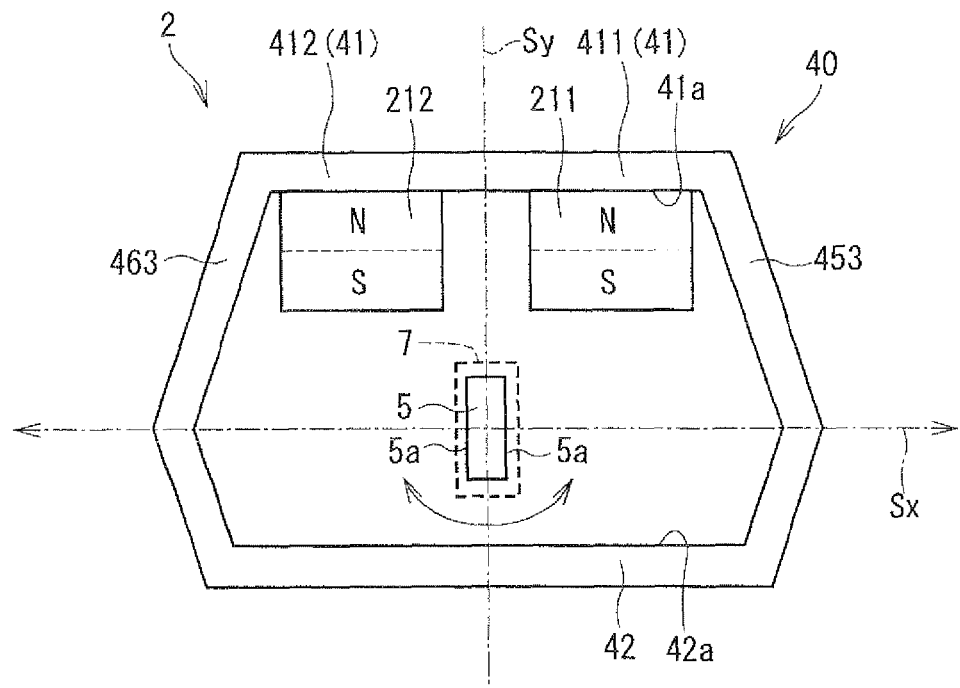
FIG. 23 is a schematic view of a rotation angle detector according to the other embodiment.
Figure 23:
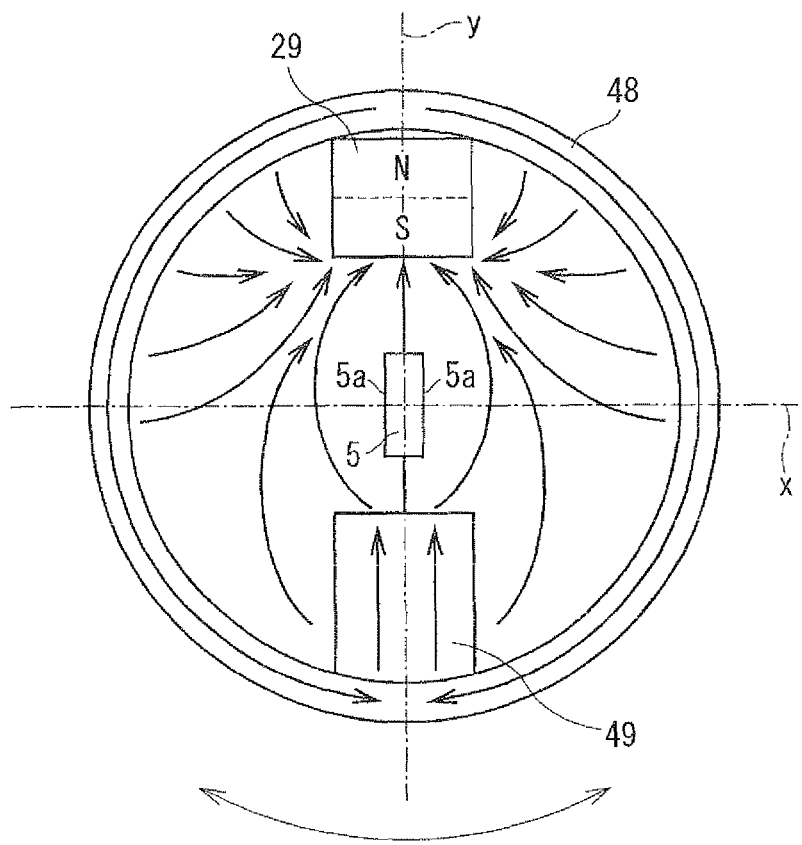

(d) As shown in FIG. 20 and FIG. 23, the yoke 40 can be hexagon-shaped. The third wall 453 and the fourth wall 463 are most apart on the reference plane "Sx".

Figure 16B:
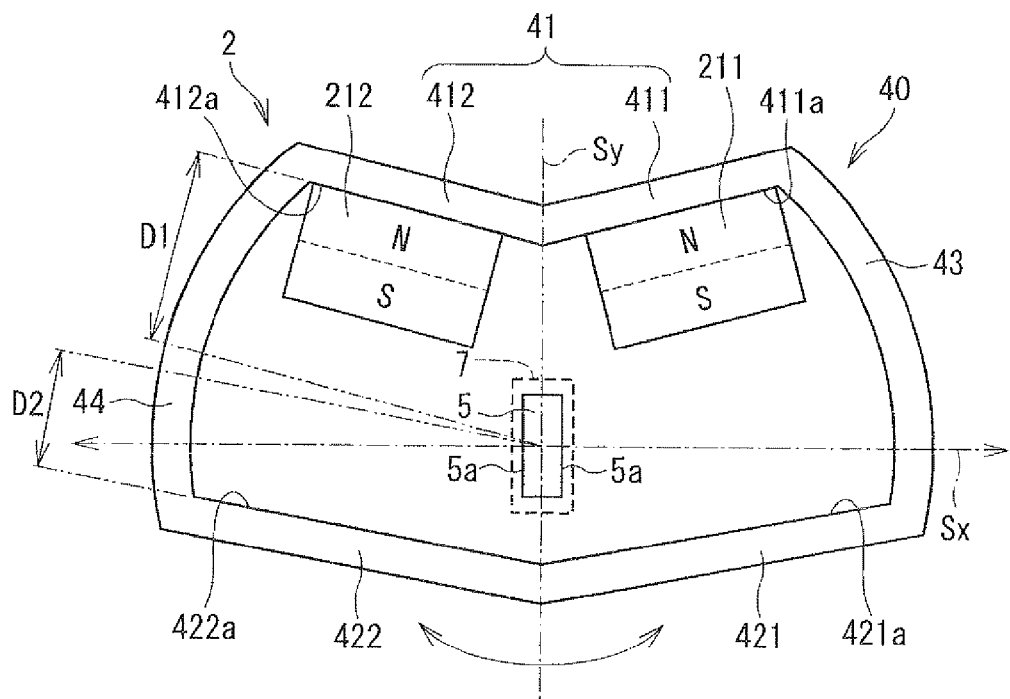
FIG. 16B is a schematic view of a rotation angle detector according to a twelfth embodiment.

(e) In FIGS. 15 to 17, another wall can be formed between the right-half wall 411 and the left-half wall 412. Also, another wall can be formed between the right-half wall 421 and left half wall 422, between the first wall 41 and the second wall 42, or between the third wall 43 and the fourth wall 44.

The present invention is not limited to the embodiments mentioned above, and can be applied to various embodiments.

What is claimed is:

1. A rotation angle detector detecting a rotation angle of a detection subject, comprising:
    a magnetic-flux-transmitting means which is shaped like a symmetrical frame made of magnetic material,
        the symmetrical frame being symmetrical with respect to a symmetrical plane which represents an arbitrary plane including a rotational axis of the detection subject,
        the rotational axis extending inside of the symmetrical frame,
        the symmetrical frame including a first wall and a second wall which are arranged opposite with respect to a reference plane including the rotational axis and being orthogonal to the symmetrical plane,
        the symmetrical frame including a third wall which connects the first wall and the second wall,
        the symmetrical frame including a fourth wall which connects the first wall and the second wall,
        the third wall and the fourth wall arranged opposite with respect to the symmetrical plane;
    a magnetic-field-generating means disposed on an inner surface of the magnetic-flux-transmitting means symmetrically with respect to the symmetrical plane; and
    a magnetism-detection means disposed between the first wall and the second wall in such a manner as to relatively rotate with respect to the magnetic-field-generating means and the magnetic-flux-transmitting means according to a rotation of the detection subject, the magnetism-detection means having a detection surface which detects a magnetic flux, wherein
    the magnetic-field-generating means is disposed on only the inner surface of the first wall, and the magnetic-field-generating means is magnetized in a direction orthogonal to the first wall.

2. A rotation angle detector according to claim 1, wherein the first wall and the second wall are arranged in parallel with the reference plane, and
    the magnetic-field-generating means is a single magnet disposed on the inner surface of the first wall.

3. A rotation angle detector according to claim 2, wherein the magnetic-field-generating means is a rectangular magnet.

4. A rotation angle detector according to claim 2, wherein the magnetic-field-generating means is a group of divided magnets which are arranged in such a manner that a same kind of magnetic pole is adjacent to each other.

5. A rotation angle detector according to claim 1, wherein the first wall includes a right-half wall and a left-half wall, the magnetic-field-generating means includes a first magnet disposed on an inner surface of the right-half wall and a second magnet disposed on an inner surface of the left-half wall, and
    the first magnet and the second magnet are magnetized in directions orthogonal to the right-half wall and the left-half wall respectively.

6. A rotation angle detector according to claim 5, wherein the right-half wall and the left-half wall extend in parallel with the reference plane.

7. A rotation angle detector according to claim 5, wherein the right-half wall and the left-half wall are inclined with respect to the reference plane in such a manner as to be apart from the reference plane toward the symmetrical plane.

8. A rotation angle detector according to claim 5, wherein the right-half wall and the left-half wall are inclined with respect to the reference plane in such a manner as to be close to the reference plane toward the symmetrical plane.

9. A rotation angle detector according to claim 5, wherein the first magnet and the second magnet are rectangular-shaped.

10. A rotation angle detector according to claim 5, wherein each of the first magnet and the second magnet is comprised of divided magnets which have the same polar direction.

11. A rotation angle detector according to claim 5, wherein the second wall is comprised of a second right-half wall and a second left-half wall, and
the second right-half wall and the second left-half wall are inclined with respect to the reference plane in such a manner as to be apart from the reference plane toward the symmetrical plane.

12. A rotation angle detector according to claim 5, wherein the second wall is comprised of a second right-half wall and a second left-half wall, and
the second right-half wall and the second left-half wall are inclined with respect to the reference plane in such a manner as to be close to the reference plane toward the symmetrical plane.

13. A rotation angle detector according to claim 1, wherein the third wall and the fourth wall are shaped in such a manner that a distance therebetween is maximum on the reference plane and the distance becomes shorter in a direction apart from the reference plane.

14. A rotation angle detector according to claim 13, wherein
the third wall and the fourth wall are shaped in such a manner that their cross sectional shapes orthogonal to the rotation axis are arc-shaped around the rotation axis.

15. A rotation angle detector according to claim 13, wherein
a distance between the rotation axis and the second wall is shorter than a distance between the rotation axis and the first wall.

16. A rotation angle detector according to claim 15, wherein
the magnetism-detection means is arranged on the symmetrical plane in such a manner as to deviate from the rotation axis toward the second wall by a specified distance.

17. A rotation angle detector according to claim 1, wherein the magnetism-detection means includes
a first magnetism-detection element which outputs a signal indicative of a variation in magnetic field, which is caused due to a relative rotation of the magnetism-detection means with respect to the magnetic-field-generating means.

18. A rotation angle detector according to claim 17, wherein
the first magnetism-detection element is a Hall element.

19. A rotation angle detector according to claim 17, wherein
the magnetism-detection means further includes:
a second magnetism-detection element which is arranged at a vicinity of the first magnetism-detection element in such a manner as to detect a magnetic flux which is directed in a direction different from a magnetic flux which the first magnetism-detection element detects; and
a computing means for computing a rotation angle of the detection subject based on the output signals of the first magnetism-detection element and the second magnetism-detection element according to a trigonometric function computation.

20. A rotation angle detector according to claim 19, wherein
the magnetism-detection means includes
a linear correction means for linearly correcting a computation angle which the computing means computes, such that the computation angle linearly varies relative to the rotation angle of the detection subject.

21. A rotation angle detector according to claim 20, wherein
the first magnetism-detection element, the second magnetism-detection element, the computing means and the linear correction means are formed on a single semiconductor chip.

22. A rotation angle detector according to claim 19, wherein
each of the first magnetism-detection element and the second magnetism-detection element is a Hall element.

23. A rotation angle detector according to claim 1, wherein the magnetism-detection means includes
a linear correction means for linearly correcting a magnetic flux density which the first magnetism-detection element detects, such that the magnetic flux density linearly varies relative to the rotation angle of the detection subject.

24. A rotation angle detector according to claim 23, wherein
the first magnetism-detection element and the linear correction means are formed on a single semiconductor chip.

* * * * *